United States Patent
Kang et al.

(10) Patent No.: US 11,871,433 B2
(45) Date of Patent: *Jan. 9, 2024

(54) METHOD FOR TRANSMITTING AND RECEIVING PHYSICAL UPLINK CONTROL CHANNEL IN WIRELESS COMMUNICATION SYSTEM, AND DEVICE FOR SAME

(71) Applicant: LG Electronics Inc., Seoul (KR)

(72) Inventors: Jiwon Kang, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,189

(22) Filed: Jan. 10, 2023

(65) Prior Publication Data

US 2023/0189279 A1 Jun. 15, 2023

Related U.S. Application Data

(63) Continuation of application No. 17/857,605, filed on Jul. 5, 2022, which is a continuation of application No. 17/563,442, filed on Dec. 28, 2021, now Pat. No. 11,617,197, which is a continuation of application No. PCT/KR2020/008438, filed on Jun. 29, 2020.

(60) Provisional application No. 62/867,962, filed on Jun. 28, 2019.

(51) Int. Cl.
*H04W 72/23* (2023.01)

(52) U.S. Cl.
CPC .................. *H04W 72/23* (2023.01)

(58) Field of Classification Search
CPC ........................................ H04W 72/23
USPC ......................................... 370/329
See application file for complete search history.

(56) References Cited

U.S. PATENT DOCUMENTS

| 11,617,197 B2 * | 3/2023 | Kang ............... H04L 5/0094 |
| | | 370/329 |
| 2013/0065622 A1 | 3/2013 | Hwang |
| 2018/0035453 A1 | 2/2018 | Yamada et al. |
| 2019/0053288 A1 | 2/2019 | Zhou et al. |

(Continued)

FOREIGN PATENT DOCUMENTS

| WO | WO 2017/024516 | 2/2017 |
| WO | WO 2018/230862 | 12/2018 |

(Continued)

OTHER PUBLICATIONS

CMCC, "Enhancements on multi-beam operation," R1-1906522, Presented at 3GPP TSG RAN WG1 #97, Reno, USA, May 13-17, 2019, 7 pages.

(Continued)

*Primary Examiner* — Peter G Solinsky
(74) *Attorney, Agent, or Firm* — Fish & Richardson P.C.

(57) ABSTRACT

According to one embodiment of the present application, a method for transmitting a physical uplink control channel (PUCCH) by a terminal in a wireless communication system comprises a step of receiving setting information associated with a PUCCH, and a step of transmitting the PUCCH on the basis of the setting information. The PUCCH is transmitted from a specific PUCCH resource selected from among overlapped PUCCH resources. The specific PUCCH resource is characterized by being associated with beam failure recovery (BFR).

10 Claims, 20 Drawing Sheets

(56) References Cited

U.S. PATENT DOCUMENTS

2019/0159136 A1 5/2019 MolavianJazi et al.
2019/0306875 A1 10/2019 Zhou et al.
2019/0394082 A1 12/2019 Cirik et al.
2021/0058998 A1 2/2021 Yuan et al.

FOREIGN PATENT DOCUMENTS

WO  WO 2019/191960  10/2019
WO  WO 2020/243505  12/2020

OTHER PUBLICATIONS

Extended European Search Report in European Application No. 20830696.9, dated Jul. 5, 2022, 14 pages.
Huawei et al., "Beam failure recovery for SCell," 3GPP TSG RAN WG1 Meeting #96, R1-1903093, Athens, Greece, Feb. 25-Mar. 1, 2019, 7 pages.
International Search Report in International Appln. No. PCT/KR2020/008438, dated Sep. 23, 2020, 5 pages (with English translation).
LG Electronics, "Discussion on beam failure recovery," 3GPP TSG RAN WG1 Meeting #91, R1-1719908, Reno, USA, Nov. 27-Dec. 1, 2017, 5 pages.
Media Tek Inc., "Enhancements on multi-beam operations," R1-1906537, Presented at 3GPP TSG RAN WG1 #97, Reno, USA, May 13-17, 2019, 13 pages.
Office Action in Chinese Appln. No. 202080047743.8, dated Mar. 16, 2023, 18 pages (with English translation).
Office Action in European Appln. No. 20830696.9, dated Apr. 19, 2023, 10 pages.
Vivo, "Clarification on PUCCH-ConfigCommon," 3GPP TSG-RAN WG2 Meeting #103bis, R2-1814184, Chengdu, China, Oct. 8-12, 2018, 3 pages.

* cited by examiner

【FIG. 1】
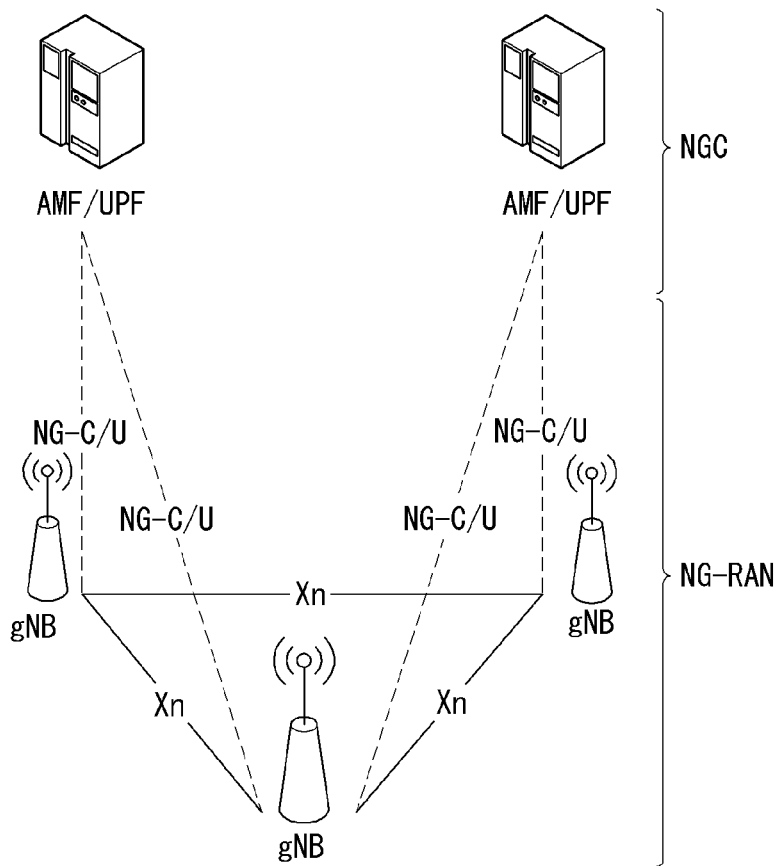
【FIG. 2】
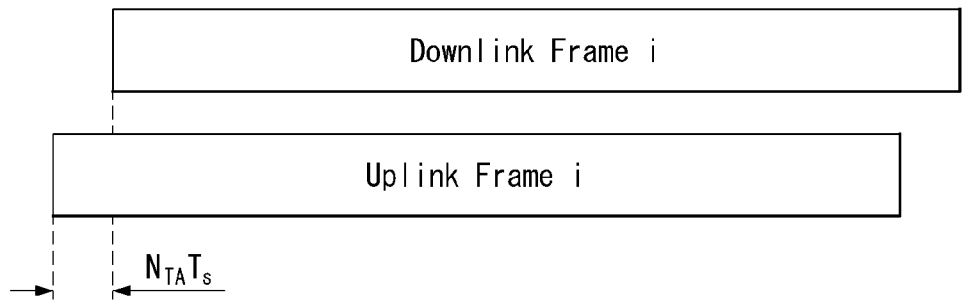

[FIG. 3]
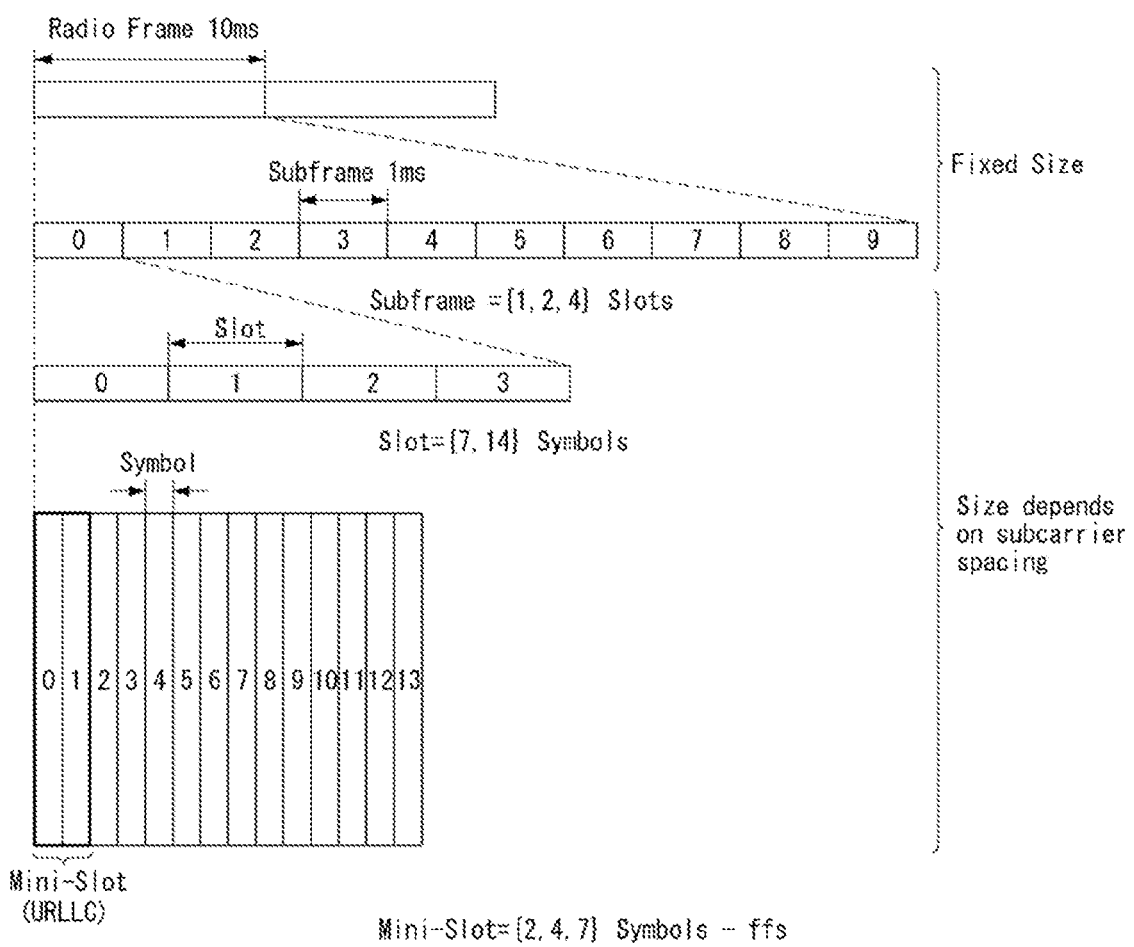

[FIG. 4]
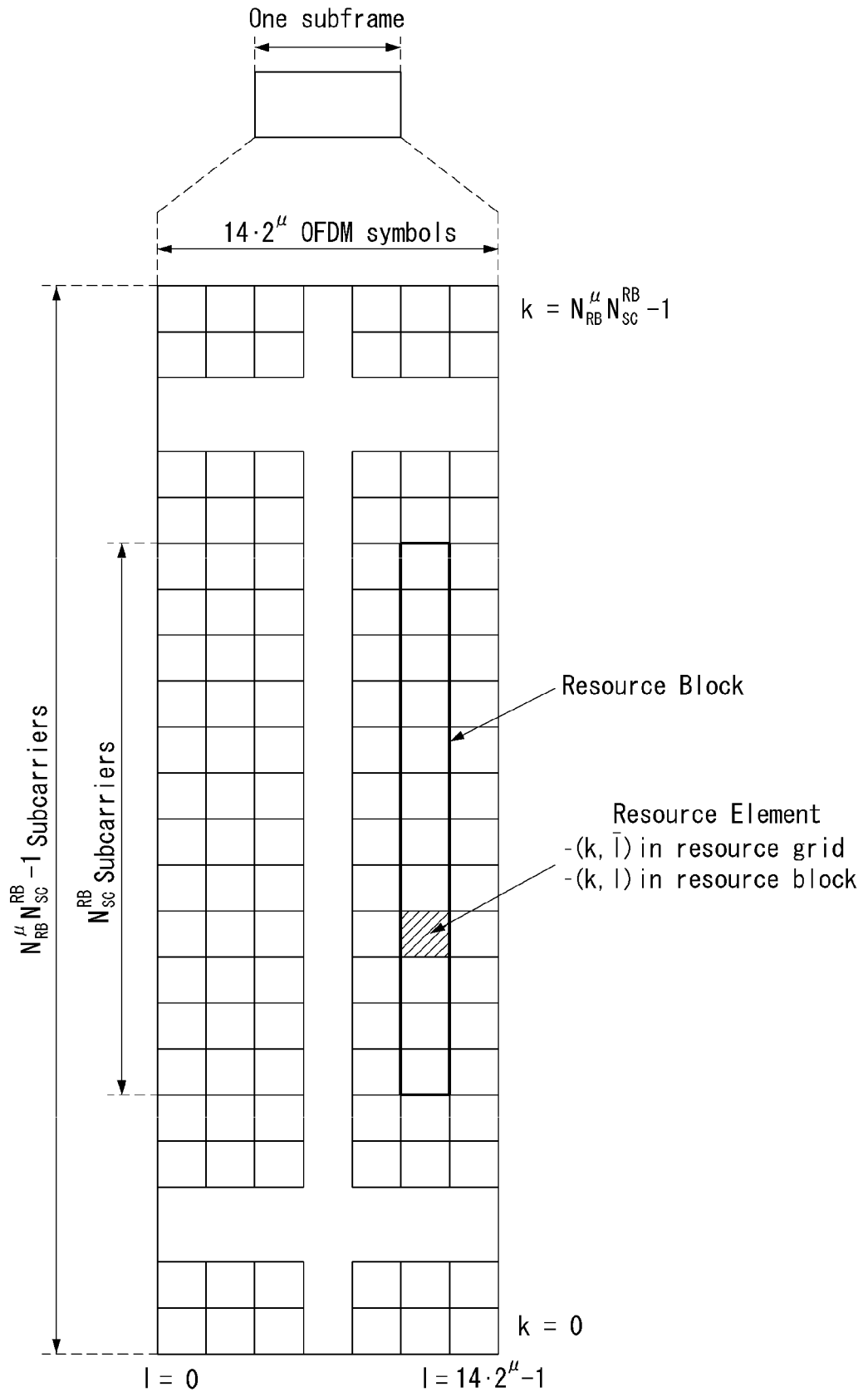

[FIG. 5]
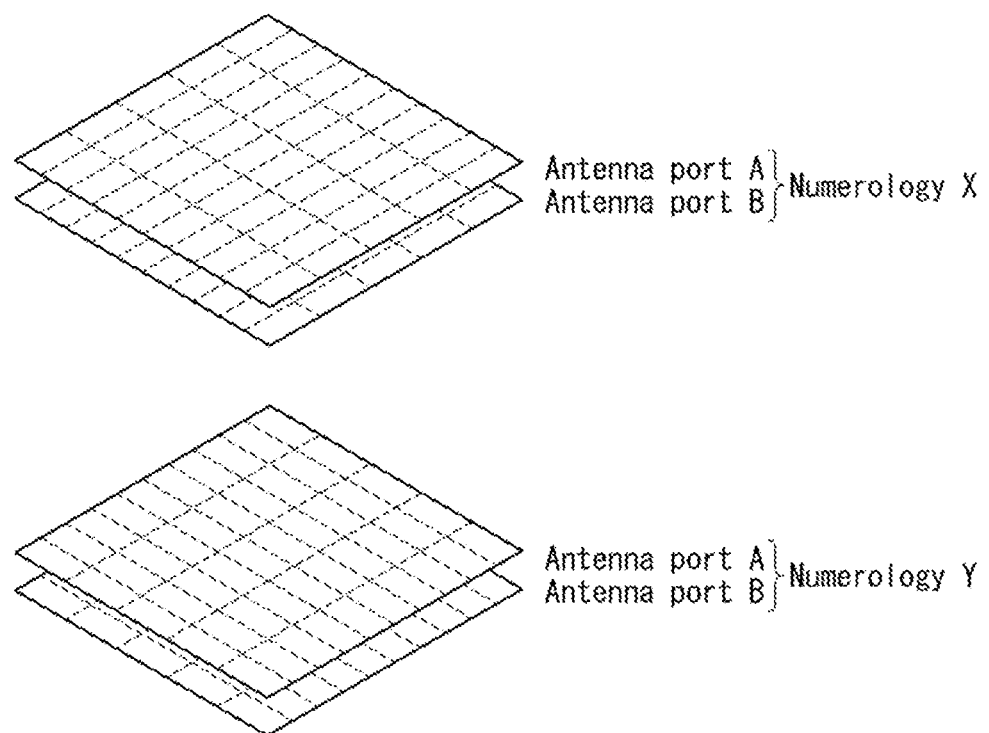

[FIG. 6]
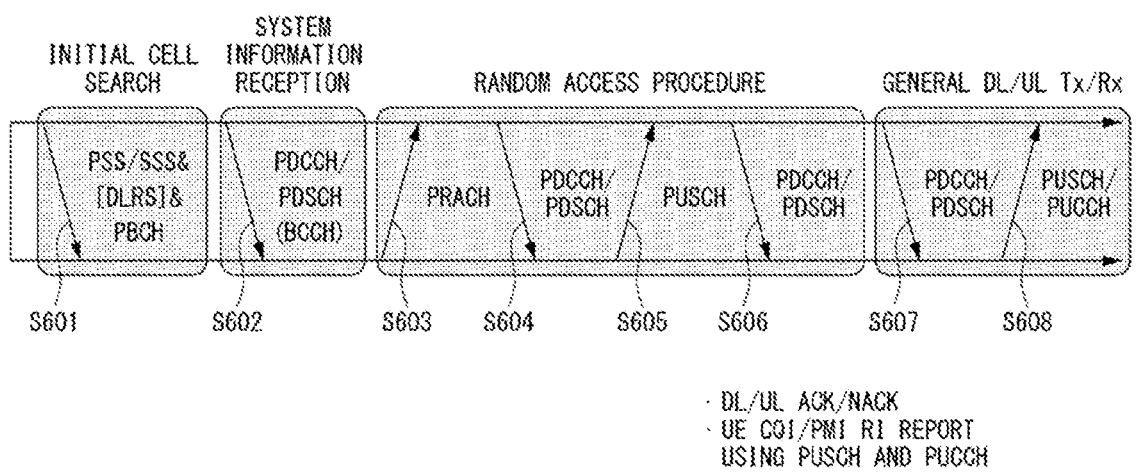

[FIG. 7]
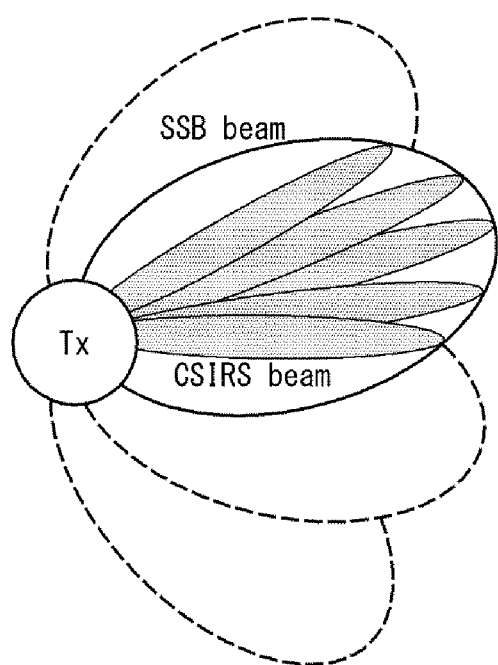

Base station Rx beam sweeping
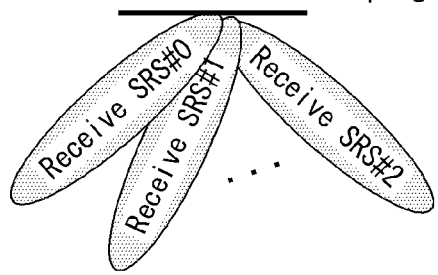
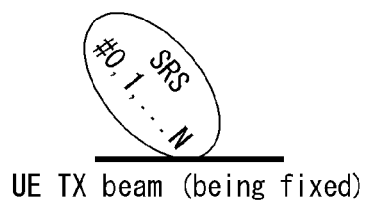
UE TX beam (being fixed)
【FIG. 8A】
Base station beam being fixed
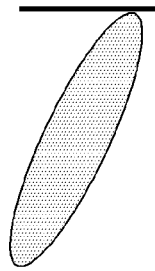
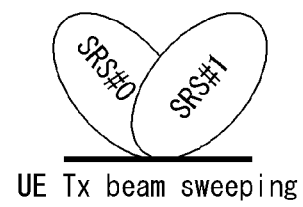
UE Tx beam sweeping
【FIG. 8B】

[FIG. 9]
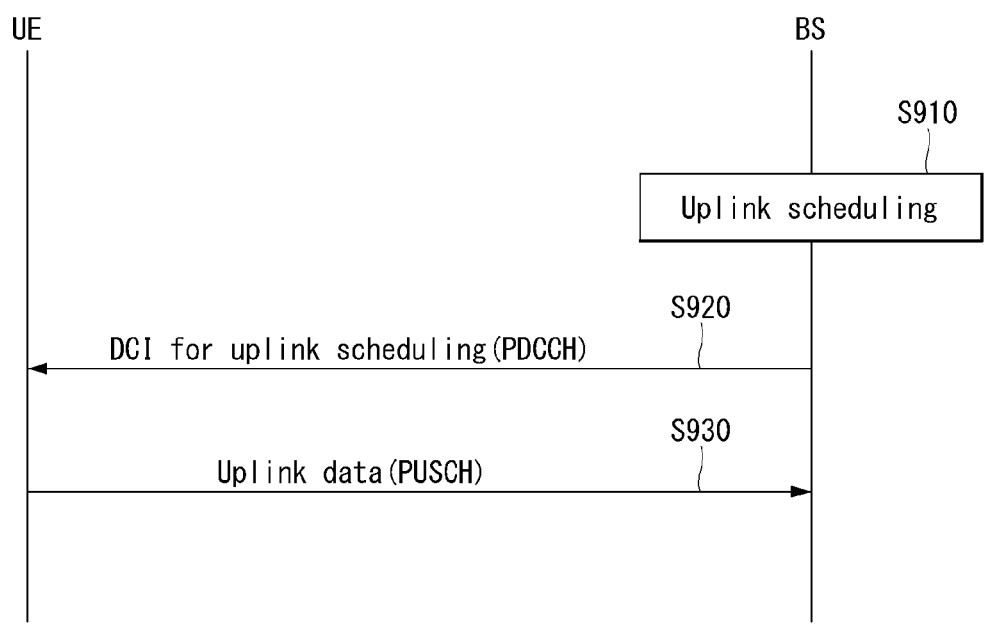

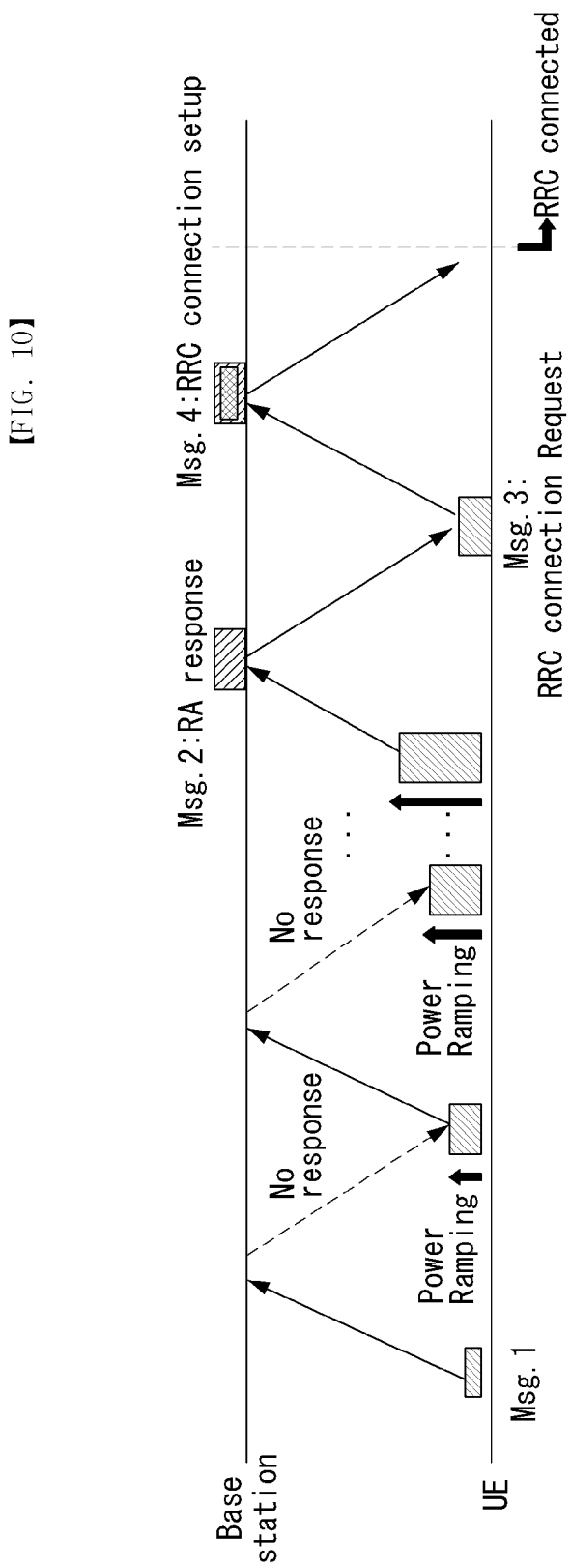

[FIG. 11]
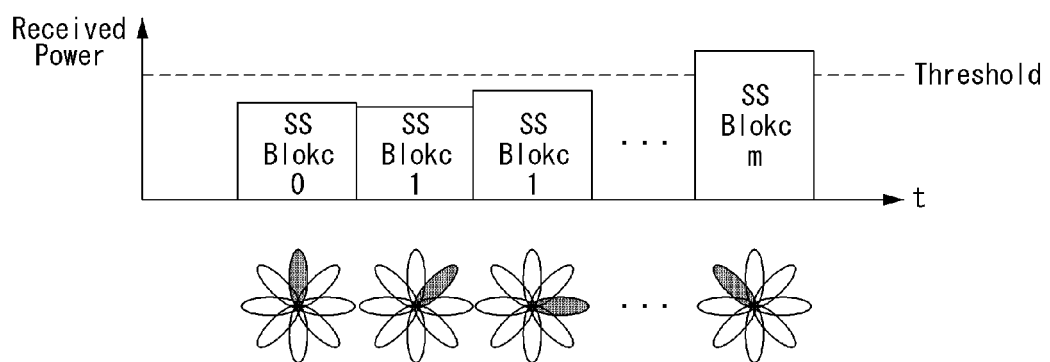

[FIG. 12]
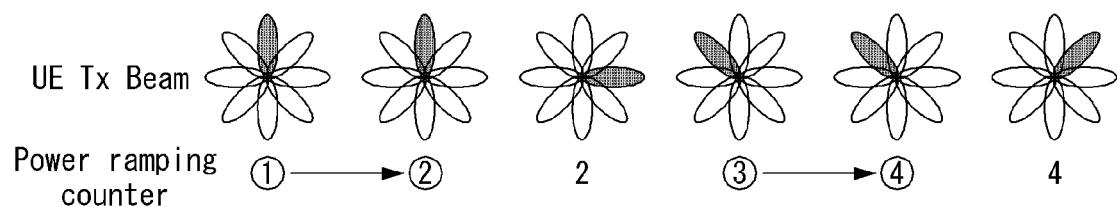

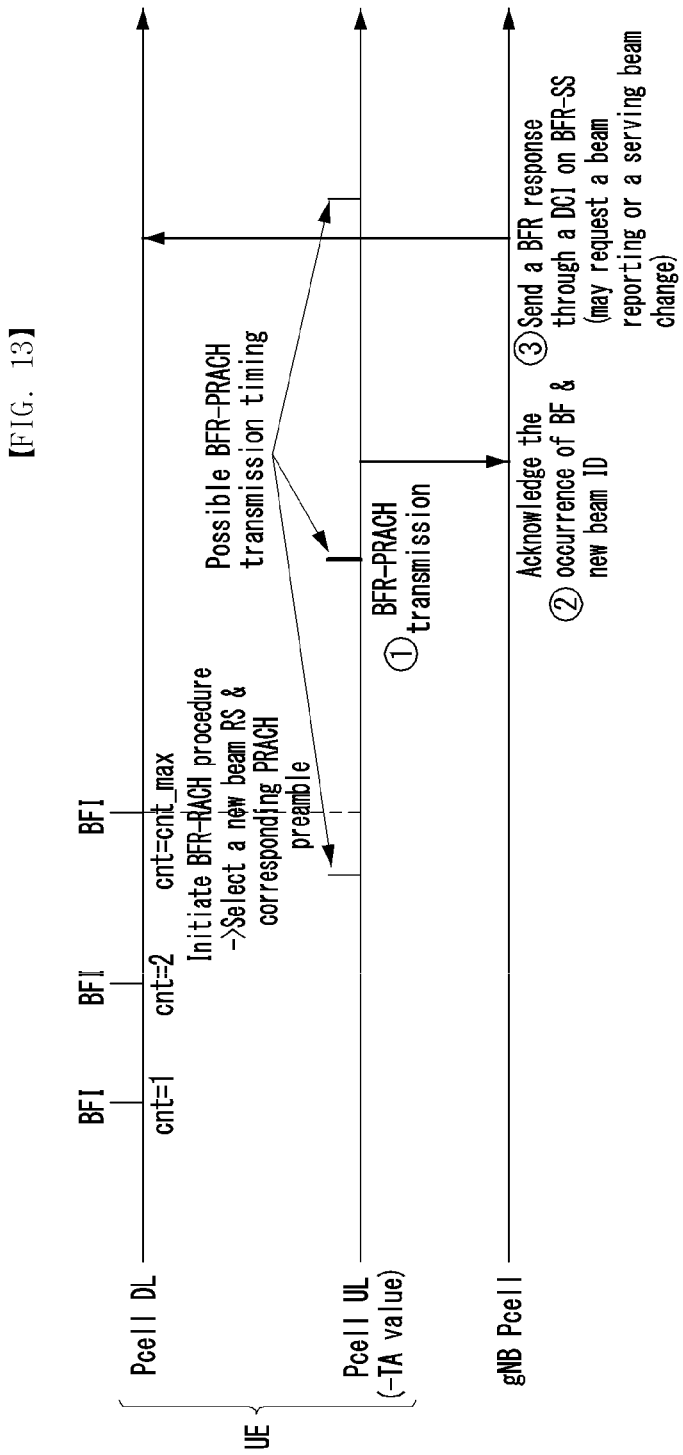
[FIG. 13]

[FIG. 14]
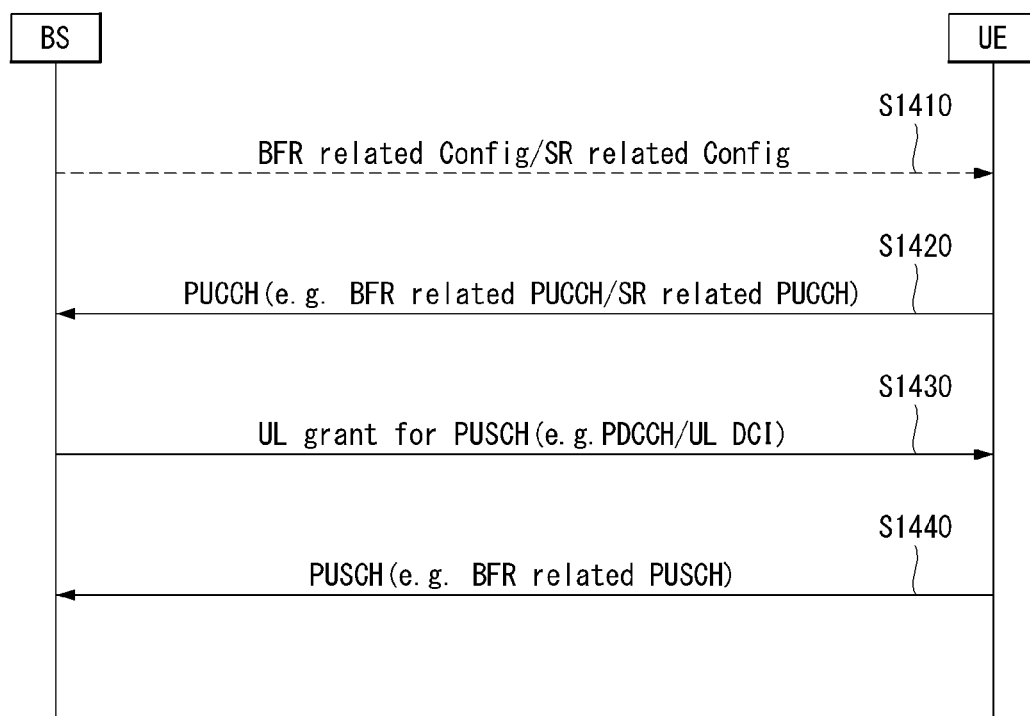

[FIG. 15]
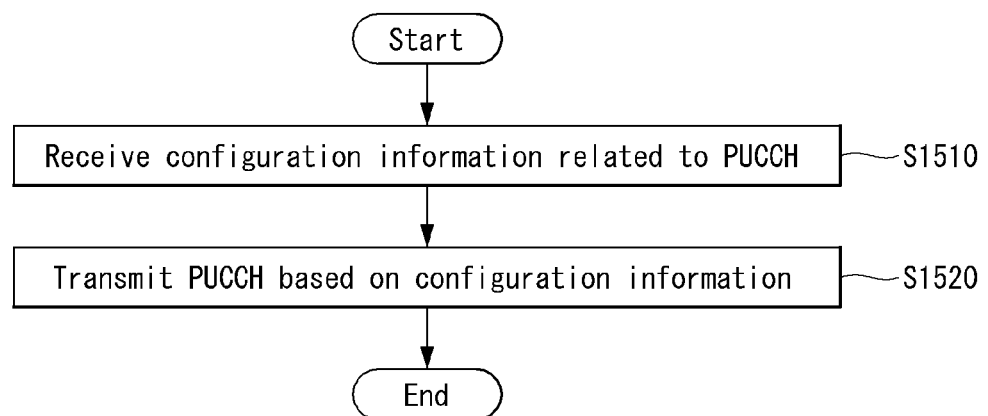

[FIG. 16]
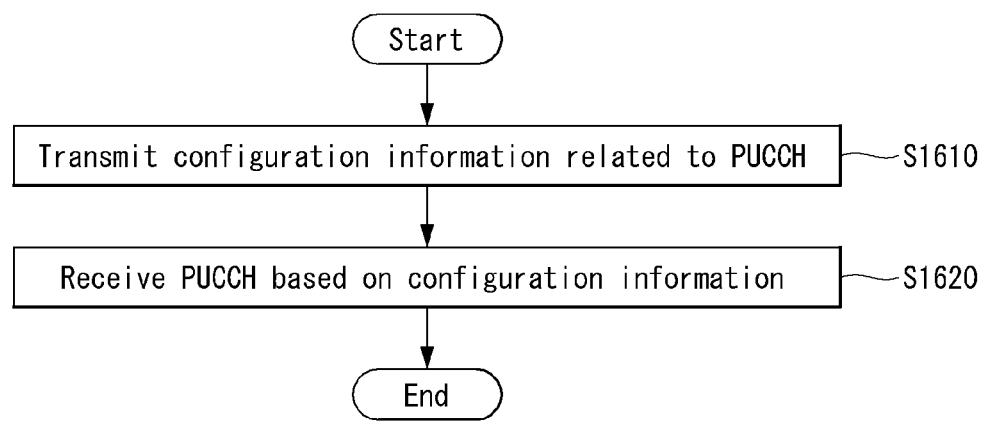

[FIG. 17]
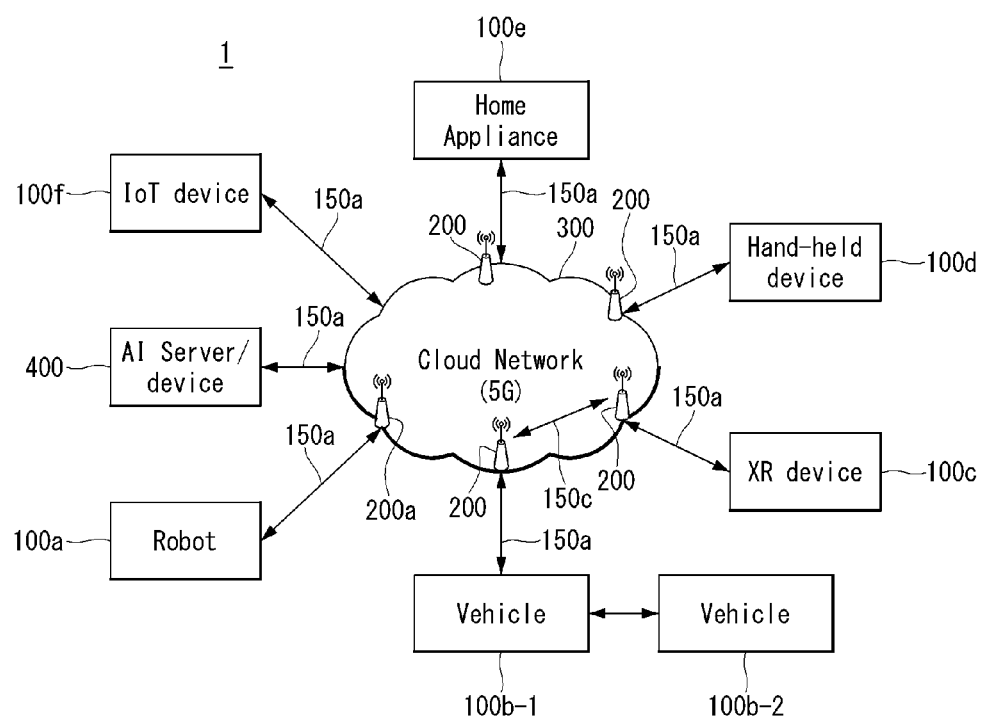

【FIG. 18】
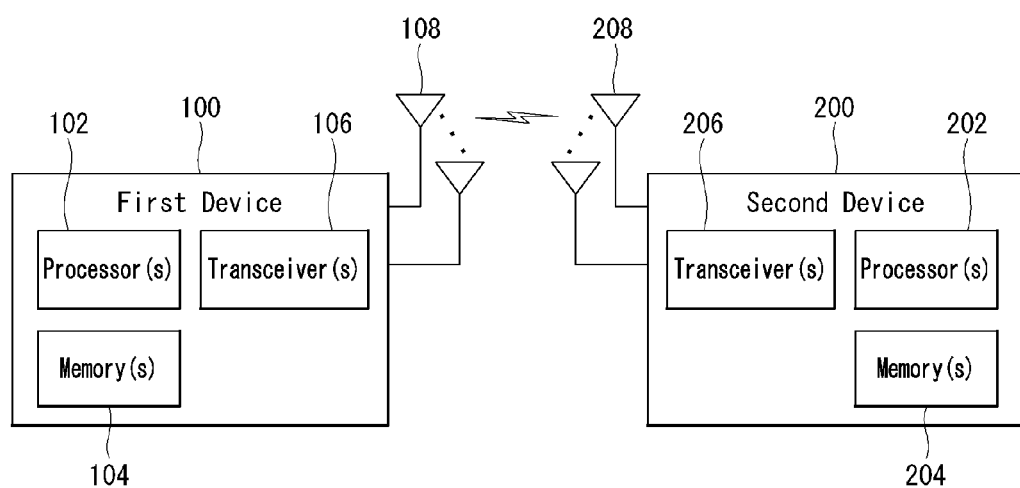

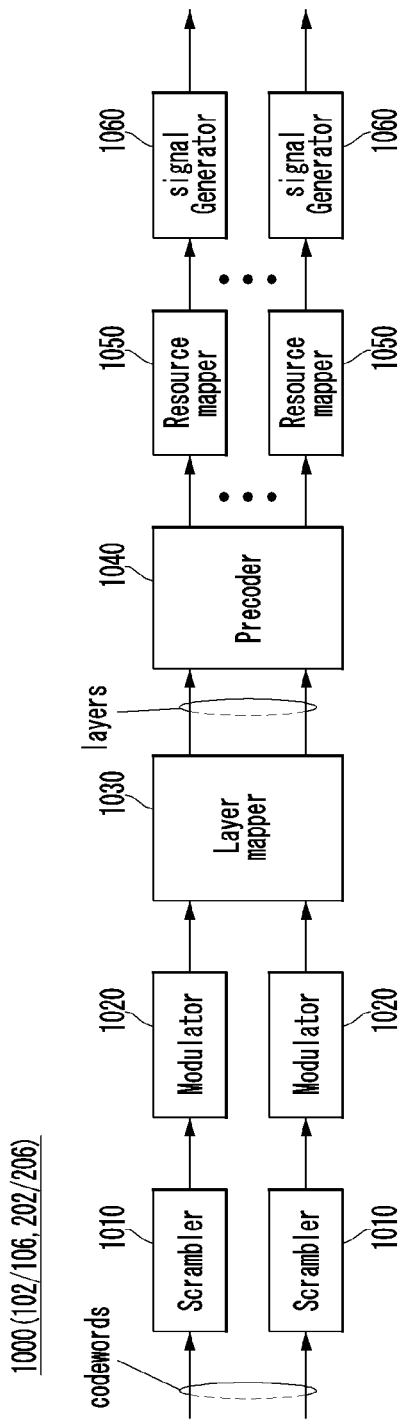
[FIG. 19]

[FIG. 20]
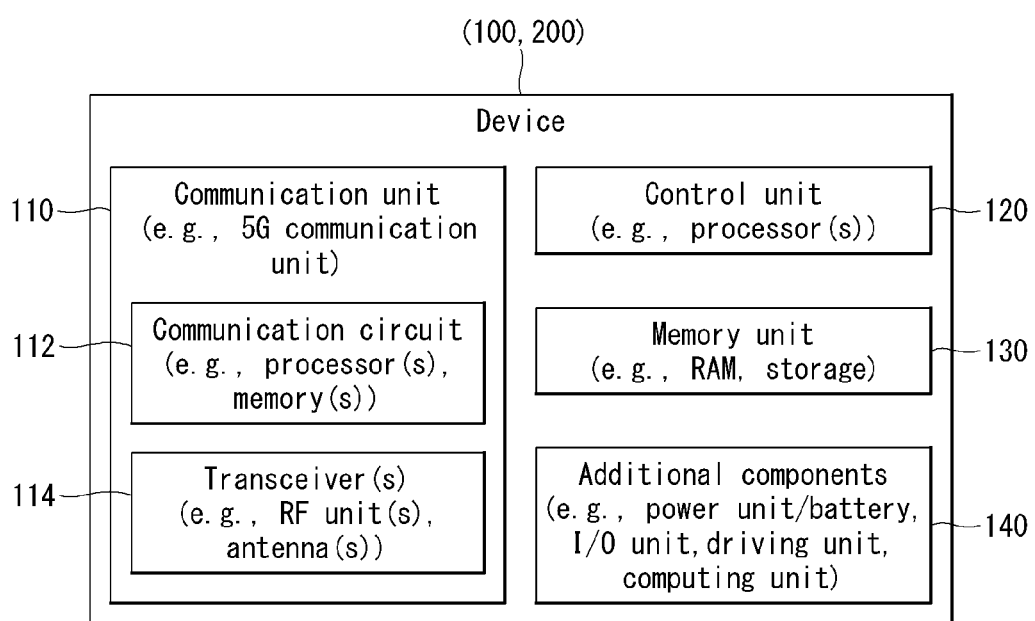

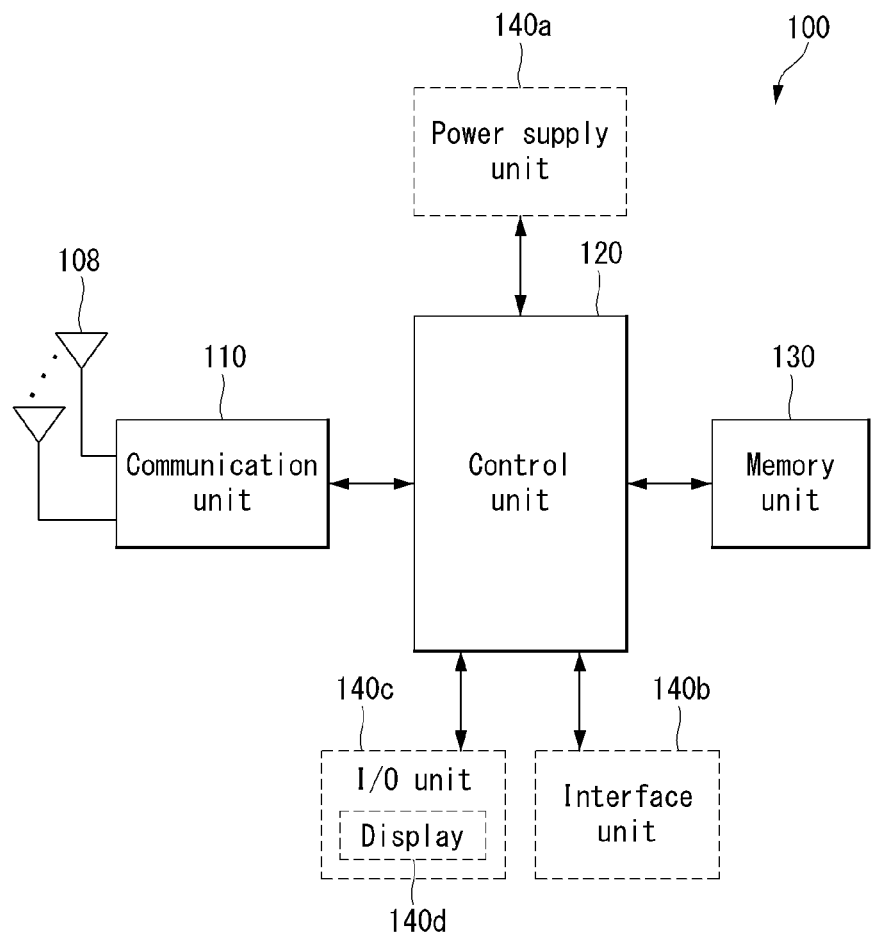
[FIG. 21]

METHOD FOR TRANSMITTING AND RECEIVING PHYSICAL UPLINK CONTROL CHANNEL IN WIRELESS COMMUNICATION SYSTEM, AND DEVICE FOR SAME

CROSS-REFERENCE TO RELATED APPLICATIONS

This application is a continuation of U.S. application Ser. No. 17/857,605, filed on Jul. 5, 2022, which is a continuation of U.S. application Ser. No. 17/563,442, filed on Dec. 28, 2021, which is a continuation under 35 U.S.C § 119(e) of International Application No. PCT/KR2020/008438, filed on Jun. 29, 2020, which claims the benefit of U.S. Provisional Application No. 62/867,962, filed on Jun. 28, 2019, the contents of which are all hereby incorporated by reference herein in their entireties.

TECHNICAL FIELD

The present disclosure relates to a method and apparatus for transmitting and receiving physical uplink control channels in a wireless communication system.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

SUMMARY

The present disclosure proposes a method of transmitting and receiving physical uplink control channels.

A PRACH-based BFR procedure to which a carrier aggregation (CA) is applied is limitedly applied to a primary cell (PCell) or a primary-secondary cell (PSCell). The reason for this is that an UL carrier may not be present in a secondary cell (SCell) and a contention based PRACH cannot be configured.

Accordingly, the present disclosure proposes a method of transmitting and receiving physical uplink control channels for supporting beam failure recovery of a secondary cell (SCell).

Technical objects to be achieved by the present disclosure are not limited to the aforementioned technical objects, and other technical objects not described above may be evidently understood by a person having ordinary knowledge in the art to which the present disclosure pertains from the following detailed description of the present disclosure.

A method of transmitting, by a user equipment, a physical uplink control channel (PUCCH) in a wireless communication system according to an embodiment of the present disclosure includes receiving configuration information related to a physical uplink control channel (PUCCH) and transmitting the PUCCH based on the configuration information.

The PUCCH is transmitted in a PUCCH resource related to a scheduling request (SR).

Based on the PUCCH resource related to the SR being overlapped PUCCH resources, the PUCCH is transmitted in a specific PUCCH resource determined among the overlapped PUCCH resources. The specific PUCCH resource is related to beam failure recovery (BFR).

The beam failure recovery (BFR) may be related to a beam failure of at least one secondary cell (SCell).

The specific PUCCH resource may be based on a PUCCH format 0 or a PUCCH format 1.

The method may further include receiving downlink control information (DCI) scheduling a physical uplink shared channel (PUSCH) related to the PUCCH.

The method may further include transmitting the PUSCH based on the DCI.

The PUSCH may be related to a medium access control-control element (MAC-CE) including information related to the beam failure.

The MAC-CE may include information related to at least one of 1) at least one secondary cell (SCell) or 2) a new beam.

The information related to the new beam may include at least one of i) whether the new beam is present or ii) an ID of a reference signal related to the new beam.

The PUCCH related to the beam failure recovery (BFR) may be transmitted based on a parameter related to the scheduling request (SR).

The parameter related to the scheduling request (SR) may be related to at least one of a timer related to the transmission of the SR or a maximum transmission number of the SR.

A user equipment transmitting a physical uplink control channel (PUCCH) in a wireless communication system according to another embodiment of the present disclosure includes one or more transceivers, one or more processors controlling the one or more transceivers, and one or more memories operately coupled to the one or more processors and storing instructions performing operations when the transmission of a physical uplink control channel (PUCCH) is executed by the one or more processors.

The operations include receiving configuration information related to a physical uplink control channel (PUCCH), and transmitting the PUCCH based on the configuration information. The PUCCH is transmitted in a PUCCH resource related to a scheduling request (SR).

Based on the PUCCH resource related to the SR being overlapped PUCCH resources, the PUCCH is transmitted in a specific PUCCH resource determined among the overlapped PUCCH resources. The specific PUCCH resource is related to beam failure recovery (BFR).

The beam failure recovery (BFR) may be related to a beam failure of at least one secondary cell (SCell).

The PUCCH related to the beam failure recovery (BFR) may be transmitted based on a parameter related to the scheduling request (SR).

An apparatus according to still another embodiment of the present disclosure includes one or more memories and one or more processors functionally connected to the one or more memories.

The one or more processors are configured to enable the apparatus to receive configuration information related to a physical uplink control channel (PUCCH) and to transmit the PUCCH based on the configuration information. The PUCCH is transmitted in a PUCCH resource related to a scheduling request (SR).

Based on the PUCCH resource related to the SR being overlapped PUCCH resources, the PUCCH is transmitted in a specific PUCCH resource determined among the overlapped PUCCH resources. The specific PUCCH resource is related to beam failure recovery (BFR).

One or more non-transitory computer-readable media according to still another embodiment of the present disclosure store one or more instructions.

One or more instructions executable by one or more processors are configured to enable a user equipment to receive configuration information related to a physical uplink control channel (PUCCH) and to transmit the PUCCH based on the configuration information. The PUCCH is transmitted in a PUCCH resource related to a scheduling request (SR).

Based on the PUCCH resource related to the SR being overlapped PUCCH resources, the PUCCH is transmitted in a specific PUCCH resource determined among the overlapped PUCCH resources. The specific PUCCH resource is related to beam failure recovery (BFR).

According to an embodiment of the present disclosure, a physical uplink control channel (PUCCH) is transmitted in a PUCCH resource related to a scheduling request (SR). Based on the PUCCH resource related to the SR being overlapped PUCCH resources, the PUCCH is transmitted in a specific PUCCH resource determined among the overlapped PUCCH resources. The specific PUCCH resource is related to beam failure recovery (BFR).

Beam failure recovery may be performed based on a PUCCH related to a scheduling request. The beam failure recovery (BFR) can also be effectively supported for a secondary cell (SCell). In particular, when a beam failure occurs in a secondary cell (SCell) for a high frequency band (e.g., 30 GHz), beam failure recovery can be more effectively performed.

Furthermore, when a PUCCH resource related to beam failure recovery overlaps a PUCCH resource related to a scheduling request (e.g., an SR attributable to an event other than beam failure recovery), a PUCCH resource related to the beam failure recovery may be transmitted to have priority. Accordingly, when an SR event and a BFR event simultaneously occur, ambiguity in a UE operation can be solved, and a beam failure recovery procedure (BFR procedure) can be more quickly initiated.

If a UE notifies a base station of only the occurrence of a beam failure through a PUCCH, relatively small information (e.g., 1 bit) is delivered. In this aspect, the PUCCH needs to be transmitted using the existing procedure.

According to an embodiment of the present disclosure, a PUCCH related to beam failure recovery (BFR) is transmitted based on a parameter related to the scheduling request (SR). The parameter related to the scheduling request (SR) is related to at least one of a timer related to the transmission of the SR or a maximum transmission number of the SR. Accordingly, the beam failure recovery (BFR) can be initiated based on the existing scheduling request procedure.

If a base station is notified of only the occurrence of a beam failure, a subsequent report related to beam failure recovery needs to be performed. According to an embodiment of the present disclosure, a UE receives downlink control information (DCI) that schedules a PUSCH related to a PUCCH, and transmits the PUSCH based on the DCI. The PUSCH is related to a medium access control-control element (MAC-CE) including information related to the beam failure. The MAC-CE includes information related to at least one of 1) at least one secondary cell (SCell) or 2) a new beam. Accordingly, detailed information related to a beam failure can be effectively delivered through a PUSCH scheduled based on the existing scheduling procedure.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIGS. 8A and 8B illustrate an example of a UL BM procedure using an SRS.

FIG. 9 illustrates an uplink transmission/reception operation to which the method proposed in this disclosure may be applied.

FIG. 10 illustrates an example of a random access procedure.

FIG. 11 is a diagram for explaining the concept of a threshold value for an SS block for RACH resource association.

FIG. 12 is a diagram for explaining a ramping counter of a PRACH.

FIG. 13 is a diagram for describing a beam failure recovery-related operation to which a method proposed in the present disclosure may be applied.

FIG. 14 illustrates an example of signaling between a UE/base station to which a method proposed in the present disclosure may be applied.

FIG. 15 is a flowchart for describing a method of transmitting, by a UE, a physical uplink control channel in a wireless communication system according to an embodiment of the present disclosure.

FIG. 16 is a flowchart for describing a method of receiving, by a base station, a physical uplink control channel in a wireless communication system according to another embodiment of the present disclosure.

FIG. 17 illustrates a communication system 1 applied to the present disclosure.

FIG. 18 illustrates wireless devices applicable to the present disclosure.

FIG. 19 illustrates a signal process circuit for a transmission signal.

FIG. 20 illustrates another example of a wireless device applied to the present disclosure.

FIG. 21 illustrates a hand-held device applied to the present disclosure.

DETAILED DESCRIPTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) a ULtra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies may be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu}N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, l̄), where k=0, . . . , $N_{RB}^{\mu}N_{sc}^{RB}-1$ is an index on a frequency domain, and l̄=0, . . . , $2^{\mu}N_{symb}^{(\mu)}-1$ refers to a location of a symbol in a subframe. The index pair (k,l̄) is used to refer to a resource element in a slot, where l=0, . . . , $N_{symb}^{\mu}-1$.

The resource element (k, l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \qquad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State ::=               SEQUENCE {
    tci-StateId                 TCI-StateId,
    qcl-Type1                   QCL-Info,
    qcl-Type2                   QCL-Info
                                OPTIONAL,   -- Need R
    ...
}
QCL-Info ::=                SEQUENCE {
    cell                        ServCellIndex
                                OPTIONAL,   -- Need R
    bwp-Id                      BWP-Id
                                OPTIONAL, -- Cond CSI-RS-ResourceId,
    referenceSignal             CHOICE {
        csi-rs                      NZP-CSI-RS-ResourceId,
        ssb                         SSB-Index
    },
    qcl-Type                    ENUMERATED {typeA, typeB, typeC,
                                typeD},
    ...
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': (Doppler shift, Doppler spread, average delay, delay spread)
'QCL-TypeB': (Doppler shift, Doppler spread)
'QCL-TypeC': (Doppler shift, average delay)
'QCL-TypeD': (Spatial Rx parameter)

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIGS. 8A and 8B illustrate an example of a UL BM procedure using a SRS.

More specifically, FIG. 8A illustrates an Rx beam determination procedure of a base station, and FIG. 8A illustrates a Tx beam sweeping procedure of a UE.

FIG. 9 illustrates an uplink transmission/reception operation to which the method proposed in this disclosure may be applied.

Referring to FIG. 9, a BS schedules uplink transmission such as a frequency/time resource, a transport layer, an uplink precoder, and an MCS (S910). In particular, the BS may determine a beam for a UE to transmit a PUSCH.

The UE receives a DCI for uplink scheduling (i.e., including scheduling information of the PUSCH) on a PDCCH from the BS (S920).

For uplink scheduling, DCI format 0_0 or 0_1 may be used. In particular, DCI format 0_1 includes the following information.

DCI format identifier (identifier for DCI formats), UL/SUL (supplementary uplink) indicator (UL/SUL indicator), bandwidth part indicator, frequency domain resource assignment, time domain resource assignment, frequency hopping flag, modulation and coding scheme (MCS), SRS resource indicator (SRI), precoding information and number of layers, antenna port(s), SRS request, DMRS sequence initialization, uplink shared channel (UL-SCH) indicator.

In particular, SRS resources configured in the SRS resource set associated with the higher layer parameter 'usage' may be indicated by an SRS resource indicator field. In addition, 'spatialRelationInfo' may be set for each SRS resource, and the value may be one of {CRI, SSB, SRI}.

The UE transmits uplink data to the BS on PUSCH (S930).

When the UE detects a PDCCH including DCI format 0_0 or 0_1, it transmits a corresponding PUSCH according to an indication by the corresponding DCI.

For PUSCH transmission, two transmission schemes are supported: codebook-based transmission and non-codebook-based transmission.

i) When the higher layer parameter 'txConfig' is set to 'codebook', the UE is set to codebook-based transmission. Meanwhile, when the higher layer parameter 'txConfig' is set to 'nonCodebook', the UE is set to non-codebook-based transmission. If the higher layer parameter 'txConfig' is not set, the UE does not expect to be scheduled by DCI format 0_1. When the PUSCH is scheduled by DCI format 0_0, PUSCH transmission is based on a single antenna port.

In the case of codebook-based transmission, the PUSCH may be scheduled by DCI format 0_0, DCI format 0_1 or semi-statically. When the PUSCH is scheduled by DCI format 0_1, the UE determines a PUSCH transmission precoder based on SRI, TPMI (Transmit Precoding Matrix Indicator) and transmission rank from DCI, as given by the SRS resource indicator field and the precoding information and number of layers field. The TPMI is used to indicate a precoder to be applied across an antenna port, and corresponds to an SRS resource selected by the SRI when multiple SRS resources are configured. Alternatively, when a single SRS resource is configured, the TPMI is used to indicate a precoder to be applied across the antenna port and corresponds to the single SRS resource. A transmission precoder is selected from the uplink codebook having the same number of antenna ports as the higher layer parameter 'nrofSRS-Ports'.

When the higher layer parameter 'txConfig' set to 'codebook' in the UE is configured, at least one SRS resource is configured in the UE. The SRI indicated in slot n is associated with the latest transmission of the SRS resource identified by the SRI, and here, the SRS resource precedes a PDCCH carrying the SRI (i.e., slot n).

ii) In the case of non-codebook-based transmission, the PUSCH may be scheduled by DCI format 0_0, DCI format 0_1 or semi-statically. When multiple SRS resources are configured, the UE may determine the PUSCH precoder and transmission rank based on the wideband SRI, and here, the SRI is given by the SRS resource indicator in the DCI or by the higher layer parameter 'srs-ResourceIndicator'. The UE uses one or multiple SRS resources for SRS transmission, and here, the number of SRS resources may be configured for simultaneous transmission within the same RB based on UE capability. Only one SRS port is configured for each SRS resource. Only one SRS resource may be set as the higher layer parameter 'usage' set to 'nonCodebook'. The maximum number of SRS resources that may be configured for non-codebook-based uplink transmission is 4. The SRI indicated in slot n is associated with the latest transmission of the SRS resource identified by the SRI, and here, the SRS transmission precedes the PDCCH carrying the SRI (i.e., slot n).

Random Access Related Procedure

The random access procedure of the UE can be summarized in Table 6 and FIG. 10.

TABLE 6

| | Type of Signals | Operations/Information Acquired |
|---|---|---|
| 1st step | PRACH preamble in UL | * Initial beam acquisition<br>* Random election of RA-preamble ID |
| 2nd Step | Random Access Response on DL-SCH | * Timing alignment information<br>* RA-preamble ID<br>* Initial UL grant, Temporary C-RNTI |
| 3rd Step | UL transmission on UL-SCH | * RRC connection request<br>* UE identifier |
| 4th Step | Contention Resolution on DL | * Temporary C-RNTI on PDCCH for initial access<br>* C-RNTI on PDCCH for UE in RRC_CONNECTED |

FIG. 10 illustrates an example of a random access procedure.

Firstly, the UE may transmit PRACH preamble in UL as Msg1 of the random access procedure.

Random access preamble sequences, of two different lengths are supported. Long sequence length 839 is applied with subcarrier spacings of 1.25 and 5 kHz and short sequence length 139 is applied with sub-carrier spacings 15, 30, 60 and 120 kHz. Long sequences support unrestricted sets and restricted sets of Type A and Type B, while short sequences support unrestricted sets only.

Multiple RACH preamble formats are defined with one or more RACH OFDM symbols, and different cyclic prefix and guard time. The PRACH preamble configuration to use is provided to the UE in the system information.

When there is no response to the Msg1, the UE may retransmit the PRACH preamble with power ramping within the prescribed number of times. The UE calculates the PRACH transmit power for the retransmission of the preamble based on the most recent estimate pathloss and power ramping counter. If the UE conducts beam switching, the counter of power ramping remains unchanged.

The system information informs the UE of the association between the SS blocks and the RACH resources.

FIG. 11 is a diagram for explaining the concept of a threshold value for an SS block for RACH resource association.

The threshold of the SS block for RACH resource association is based on the RSRP and network configurable. Transmission or retransmission of RACH preamble is based on the SS blocks that satisfy the threshold.

When the UE receives random access response on DL-SCH, the DL-SCH may provide timing alignment information, RA-preamble ID, initial UL grant and Temporary C-RNTI.

Based on this information, the UE may transmit UL transmission on UL-SCH as Msg3 of the random access procedure. Msg3 can include RRC connection request and UE identifier.

In response, the network may transmit Msg4, which can be treated as contention resolution message on DL. By receiving this, the UE may enter into RRC connected state.

Specific explanation for each of the steps is as follows:

Prior to initiation of the physical random access procedure, Layer 1 shall receive from higher layers a set of SS/PBCH block indexes and shall provide to higher layers a corresponding set of RSRP measurements.

Prior to initiation of the physical random access procedure, Layer 1 shall receive the following information from the higher layers:

Configuration of physical random access channel (PRACH) transmission parameters (PRACH preamble format, time resources, and frequency resources for PRACH transmission).

Parameters for determining the root sequences and their cyclic shifts in the PRACH preamble sequence set (index to logical root sequence table, cyclic shift ($N_{CS}$), and set type (unrestricted, restricted set A, or restricted set B)).

From the physical layer perspective, the L1 random access procedure encompasses the transmission of random access preamble (Msg1) in a PRACH, random access response (RAR) message with a PDCCH/PDSCH (Msg2), and when applicable, the transmission of Msg3 PUSCH, and PDSCH for contention resolution.

If a random access procedure is initiated by a "PDCCH order" to the UE, a random access preamble transmission is with a same subcarrier spacing as a random access preamble transmission initiated by higher layers.

If a UE is configured with two UL carriers for a serving cell and the UE detects a "PDCCH order", the UE uses the UL/SUL indicator field value from the detected "PDCCH order" to determine the UL carrier for the corresponding random access preamble transmission.

Regarding the random access preamble transmission step, physical random access procedure is triggered upon request of a PRACH transmission by higher layers or by a PDCCH order. A configuration by higher layers for a PRACH transmission includes the following:

A configuration for PRACH transmission.

A preamble index, a preamble subcarrier spacing, $P_{PRACHtarget}$, a corresponding RA-RNTI, and a PRACH resource.

A preamble is transmitted using the selected PRACH format with transmission power $P_{PRACH2,f,c}(i)$, on the indicated PRACH resource.

A UE is provided a number of SS/PBCH blocks associated with one PRACH occasion by the value of higher layer parameter SSB-perRACH-Occasion. If the value of SSB-perRACH-Occasion is smaller than one, one SS/PBCH block is mapped to 1/SSB-per-rach-occasion consecutive PRACH occasions. The UE is provided a number of preambles per SS/PBCH block by the value of higher layer parameter cb-preamblePerSSB and the UE determines a total number of preambles per SSB per PRACH occasion as the multiple of the value of SSB-perRACH-Occasion and the value of cb-preamblePerSSB.

SS/PBCH block indexes are mapped to PRACH occasions in the following order.

First, in increasing order of preamble indexes within a single PRACH occasion.

Second, in increasing order of frequency resource indexes for frequency multiplexed PRACH occasions.

Third, in increasing order of time resource indexes for time multiplexed PRACH occasions within a PRACH slot.

Fourth, in increasing order of indexes for PRACH slots.

The period, starting from frame 0, for the mapping of SS/PBCH blocks to PRACH occasions is the smallest of {1, 2, 4} PRACH configuration periods that is larger than or equal to $\lceil N_{Tx}^{SSB}/N_{PRACH\ period}^{SSB} \rceil$, where the UE obtains $N_{Tx}^{SSB}$ from higher layer parameter SSB-transmitted-SIB1 and $N_{PRACHperiod}^{SSB}$ is the number of SS/PBCH blocks that can be mapped to one PRACH configuration period.

If a random access procedure is initiated by a PDCCH order, the UE shall, if requested by higher layers, transmit a PRACH in the first available PRACH occasion for which a time between the last symbol of the PDCCH order reception and the first symbol of the PRACH transmission is larger than or equal to $N_{T,2}+\Delta_{BWPSwitching}+\Delta_{Delay}$ msec where $N_{T,2}$ is a time duration of $N_2$ symbols corresponding to a PUSCH preparation time for PUSCH processing capability 1, $\Delta_{BWPSwitching}$ is pre-defined, and $\Delta_{Delay}>0$.

In response to a PRACH transmission, a UE attempts to detect a PDCCH with a corresponding RA-RNTI during a window controlled by higher layers. The window starts at the first symbol of the earliest control resource set the UE is configured for Type1-PDCCH common search space that is at least $\lceil (\Delta \cdot N_{slot}^{subframe,\mu} \cdot N_{symb}^{slot})/T_{sf} \rceil$ symbols after the last symbol of the preamble sequence transmission. The length of the window in number of slots, based on the subcarrier spacing for Type0-PDCCH common search space is provided by higher layer parameter rar-WindowLength.

If a UE detects the PDCCH with the corresponding RA-RNTI and a corresponding PDSCH that includes a DL-SCH transport block within the window, the UE passes the transport block to higher layers. The higher layers parse the transport block for a random access preamble identity (RAPID) associated with the PRACH transmission. If the higher layers identify the RAPID in RAR message(s) of the DL-SCH transport block, the higher layers indicate an uplink grant to the physical layer. This is referred to as random access response (RAR) UL grant in the physical layer. If the higher layers do not identify the RAPID associated with the PRACH transmission, the higher layers can indicate to the physical layer to transmit a PRACH. A minimum time between the last symbol of the PDSCH reception and the first symbol of the PRACH transmission is equal to $N_{T,1}+\Delta_{new}+0.5$ msec where $N_{T,1}$ is a time duration of $N_1$ symbols corresponding to a PDSCH reception time for PDSCH processing capability 1 when additional PDSCH DM-RS is configured and $\Delta_{new} \geq 0$.

A UE shall receive the PDCCH with the corresponding RA-RNTI and the corresponding PDSCH that includes the DL-SCH transport block with the same DM-RS antenna port quasi co-location properties, as for a detected SS/PBCH block or a received CSI-RS. If the UE attempts to detect the PDCCH with the corresponding RA-RNTI in response to a PRACH transmission initiated by a PDCCH order, the UE assumes that the PDCCH and the PDCCH order have same DM-RS antenna port quasi co-location properties.

A RAR UL grant schedules a PUSCH transmission from the UE (Msg3 PUSCH). The contents of the RAR UL grant, starting with the MSB and ending with the LSB, are given in Table 7. Table 7 shows random access response grant content field size.

TABLE 7

| RAR grant field | Number of bits |
| --- | --- |
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reserved bits | 3 |

The Msg3 PUSCH frequency resource allocation is for uplink resource allocation type 1. In case of frequency hopping, based on the indication of the frequency hopping flag field, the first one or two bits, $N_{UL,hop}$ bits, of the Msg3 PUSCH frequency resource allocation field are used as hopping information bits as described in following [Table I.5].

The MCS is determined from the first sixteen indices of the applicable MCS index table for PUSCH.

The TPC command $\delta_{msg2,b,f,c}$ is used for setting the power of the Msg3 PUSCH, and is interpreted according to Table 8. Table 8 shows TPC command $\delta_{msg2,b,f,c}$ for Msg3 PUSCH.

TABLE 8

| TPC command | Value(in dB) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In non-contention based random access procedure, the CSI request field is interpreted to determine whether an aperiodic CSI report is included in the corresponding PUSCH transmission. In contention based random access procedure, the CSI request field is reserved.

Unless a UE is configured a subcarrier spacing, the UE receives subsequent PDSCH using same subcarrier spacing as for the PDSCH reception providing the RAR message.

If a UE does not detect the PDCCH with a corresponding RA-RNTI and a corresponding DL-SCH transport block within the window, the UE performs the procedure for random access response reception failure.

For example, the UE may perform power ramping for retransmission of the Random Access Preamble based on a power ramping counter. However, the power ramping counter remains unchanged if a UE conducts beam switching in the PRACH retransmissions as shown in FIG. 12.

FIG. 12 is a diagram for explaining a ramping counter of a PRACH.

In FIG. 12, the UE may increase the power ramping counter by 1, when the UE retransmit the random access preamble for the same beam. However, when the beam had been changed, the power ramping counter remains unchanged.

Regarding Msg3 PUSCH transmission, higher layer parameter msg3-tp indicates to a UE whether or not the UE shall apply transform precoding, for an Msg3 PUSCH transmission. If the UE applies transform precoding to an Msg3 PUSCH transmission with frequency hopping, the frequency offset for the second hop is given in Table 9. Table 9 shows frequency offset for second hop for Msg3 PUSCH transmission with frequency hopping.

TABLE 9

| Number of PRBs in initial active UL BWP | Value of $V_{UL,\ hop}$ Hopping Bits | Frequency offset for $2^{nd}$ hop |
|---|---|---|
| $N_{BWP}^{size} < 50$ | 0 | $N_{BWP}^{size}/2$ |
| | 1 | $N_{BWP}^{size}/4$ |
| $N_{BWP}^{size} > 50$ | 00 | $N_{BWP}^{size}/2$ |
| | 01 | $N_{BWP}^{size}/4$ |
| | 10 | $-N_{BWP}^{size}/4$ |
| | 11 | reserved |

The subcarrier spacing for Msg3 PUSCH transmission is provided by higher layer parameter msg3-scs. A UE shall transmit PRACH and Msg3 PUSCH on a same uplink carrier of the same serving cell. An UL BWP for Msg3 PUSCH transmission is indicated by SystemInformation-BlockType1.

A minimum time between the last symbol of a PDSCH reception conveying a RAR and the first symbol of a corresponding Msg3 PUSCH transmission scheduled by the RAR in the PDSCH for a UE when the PDSCH and the PUSCH have a same subcarrier spacing is equal to $N_{T,1}+N_{T,2}+N_{TA,max}+0.5$ msec. $N_{T,1}$ is a time duration of $N_1$ symbols corresponding to a PDSCH reception time for PDSCH processing capability 1 when additional PDSCH DM-RS is configured, $N_{T,2}$ is a time duration of $N_2$ symbols corresponding to a PUSCH preparation time for PUSCH processing capability 1, and $N_{TA,max}$ is the maximum timing adjustment value that can be provided by the TA command field in the RAR.

In response to an Msg3 PUSCH transmission when a UE has not been provided with a C-RNTI, the UE attempts to detect a PDCCH with a corresponding TC-RNTI scheduling a PDSCH that includes a UE contention resolution identity. In response to the PDSCH reception with the UE contention resolution identity, the UE transmits HARQ-ACK information in a PUCCH. A minimum time between the last symbol of the PDSCH reception and the first symbol of the corresponding HARQ-ACK transmission is equal to $N_{T,1}+0.5$ msec. $N_{T,1}$ is a time duration of $N_1$ symbols corresponding to a PDSCH reception time for PDSCH processing capability 1 when additional PDSCH DM-RS is configured.

Beam Failure Recovery (BFR)

In performing a DL/UL beam management process, a beam mismatch problem may occur depending on configured periodicity of beam management. In particular, if a radio channel environment is changed because a UE moves its location or rotates or due to a movement of a surrounding object (e.g., an LoS environment is changed into a non-LoS environment because a beam is blocked), an optimum DL/UL beam pair may be changed. In general, such a change may be said that a beam failure event has occurred when tracking fails in a beam management process performed by network indication. A UE may determine whether such a beam failure event occurs through reception quality of a downlink RS. A report message for such a situation or a message (called a beam failure recovery request (BFRQ) message) for a beam recovery request needs to be delivered from a UE. A base station that has received such a message may perform beam recovery through various processes, such as beam RS transmission or a beam reporting request for the beam recovery. Such a series of beam recovery process is called beam failure recovery (BFR). In Rel-15 NR, a beam failure recovery (BFR) process for a PCell or a PScell (both are special cells (also called an SpCell)) in which a contention based PRACH resource is always present has been standardized. The corresponding procedure is an operation within a serving cell, is configured as follows as a beam failure detection (BFD) process of a UE, a BFRQ process, and a process of monitoring, by a UE, a response of a base station to a BFRQ (Reference: 3GPP TS38.213, TS38.321, TS38.331).

Beam Failure Detection (BFD)

If all PDCCH beams have a predetermined quality value (Q_out) or less, it is said that one beam failure instance has occurred (in this case, the quality is based on a hypothetical block error rate (BLER): That is, assuming that control information has been transmitted in a corresponding PDCCH, the probability that the demodulation of corresponding information will fail.

In this case, one or a plurality of search spaces in which a PDCCH will be monitored may be configured in a UE. All the PDCCH beams may be differently configured for each search space. In this case, this means that all the beams have a BLER threshold or less. The following two methods are supported as a criterion for determining, by a UE, a BFD RS.

[Implicit configuration of BFD RSs] a control resource set (refer to CORESET [TS38.213, TS38.214, TS38.331]) ID, that is, a resource region in which a PDCCH may be transmitted is configured in each search space. QCLed RS information (e.g., CSI-RS resource ID, SSB ID) from a spatial RX parameter viewpoint may be indicated/configured for each CORESET ID (in the NR standard, a QCLed RS is indicated/configured through transmit configuration information indication). In this case, the QCLed RS (i.e., QCL Type D in TS38.214) from the spatial RX parameter viewpoint means that a method of notifying, by a base station, a UE that the UE has to use (or may use) a beam used in corresponding spatially QCLed RS reception in corresponding PDCCH DMRS reception. As a result, from a base station viewpoint, this method is a method of notifying a UE that the UE has to perform transmission by applying the same transmission beam or a similar transmission beam (e.g., when beam directions are the same/similar, but beam widths are different) between spatially QCLed antenna ports.

[Explicit configuration of BFD RSs] a base station may explicitly configure a beam RS(s) for the use (beam failure detection). In this case, a corresponding beam RS(s) corresponds to the 'all PDCCH beam'.

Whenever an event in which a hypothetical BLER measured based on a BFD RS(s) in a UE physical layer is deteriorate to a specific threshold or more occurs, what beam failure instance (BFI) has occurred is notified through a MAC sublayer. When a BFI occurs as much as a given number (beamFailureInstanceMaxCount) within a given time (BFD timer), a UE MAC sublayer determines that a beam failure has occurred and initiates a related RACH operation.

Hereinafter, a MAC layer operation related to BFD is described.

MAC entity:
1> when beam failure instance indication is received in lower layers:
2> starts or starts again beamFailureDetectionTimer.
2> increases BFI_COUNTER by 1.
2> when BFI_COUNTER>=beamFailureInstanceMaxCount:
3> initiate a random access procedure in a SpCell.
1> when beamFailureDetectionTimer expires; or
1> when beamFailureDetectionTimer, beamFailureInstanceMaxCount or a reference signal (any of the reference signals used for beam failure detection) used to detect a beam failure is reconfigured by a higher layer:
2> configures BFI_COUNTER to 0.
1> when a random access procedure is successfully completed:
2> configures BFI_COUNTER to 0.
2> stops (configured) beamFailureRecoveryTimer.
2> considers that the beam failure recovery procedure has been successfully completed.

BFRQ (Based on PRACH): New Beam Identification+ PRACH Transmission

As described above, when a specific number of BFIs or more occur, a UE may determine that a beam failure has occurred, and may perform a beam failure recovery operation. As an example of the beam failure recovery operation, a beam failure recovery request (BFRQ) operation based on a RACH procedure (i.e., PRACH) may be performed. Hereinafter, a corresponding BFRQ procedure is specifically described.

When a BF occurs in a corresponding UE, a base station may configure an RS list (candidateBeamRSList) corresponding to candidate beams which may be replaced as RRC. Dedicated PRACH resources may be configured for corresponding candidate beams. In this case, the dedicated PRACH resources are non-contention based PRACH (also called contention free PRACH) resources. If a beam is not found in the corresponding list, a beam is selected among pre-configured SSB resources and a contention based PRACH is transmitted. A detailed procedure is as follows.

Step 1) a UE finds a beam having a predetermined quality value (Q_in) or more among RSs configured as a candidate beam RS set by a base station.

If one beam RS is greater than a threshold, a corresponding beam RS is selected.

If a plurality of beam RSs is greater than a threshold, given one of the corresponding beam RSs is selected If a beam greater than a threshold is not present, Step 2 is performed.

Note1: In this case, beam quality is based on RSRP.
Note2: the RS beam set configured by the base station includes three cases.
1) All beam RSs within the RS beam set are configured as SSBs
2) All beam RSs within the RS beam set are configured as CSI-RS resources
3) Beam RSs within the RS beam set are configured as SSBs and CSI-RS resources Step 2) A UE finds a beam having a predetermined quality value (Q_in) or more among SSBs (related to a contention based PRACH resource)

If one SSB is greater than a threshold, a corresponding beam RS is selected.

If a plurality of SSB is greater than a threshold, given one of corresponding beam RSs is selected.

If a beam greater than a threshold is not present, Step 3 is performed.

Step 3) A UE selects a given SSB among SSBs (connected to a contention based PRACH resource)

The UE transmits, to a base station, a PRACH resource & preamble that has been connection configured directly or indirectly to the beam RS (CSI-RS or SSB) selected in the above process.

In this case, the direct connection configuration is used in the case of the following 1) or 2).
1) If a contention-free PRACH resource & preamble is configured for a specific RS with respect to a candidate beam RS set separately configured for BFR use,
2) If a (contention based) PRACH resource & preamble mapped to SSBs generally configured for other use, such as random access, in a one-to-one manner In this case, the indirect connection configuration is used in the following cases.

If a contention-free PRACH resource & preamble is not configured for a specific CSI-RS within a candidate beam RS set separately configured for BFR use.

In this case, a UE selects a (contention-free) PRACH resource & preamble connected to SSB designed to be received through the same reception beam as a corresponding CSI-RS (i.e., quasi-co-located (QCLed) with respect to spatial Rx parameter).

Monitoring of gNB's Response to the BFRQ

A UE monitors the replay of a base station (gNB) for corresponding PRACH transmission.

In this case, a response to a contention-free PRACH resource & preamble is transmitted in a PDCCH masked with a C-RNTI, and is separately received in a RRC-configured search space for BFR.

The search space is configured in a specific CORESET (for BFR).

A CORESET (e.g., CORESET 0 or CORESET 1) and search space configured for a common contention PRACH based random access process is used for a response to a contention PRACH without any change.

If a reply is not present for a given time, the UE repeats a new beam identification & selection process and a BFRQ & monitoring gNB's response process.

The process may be performed until PRACH transmission reaches a preset maximum number N_max or a configured timer (BFR timer) expires.

When the timer expires, the UE stops contention free PRACH transmission, but may perform contention based PRACH transmission based on the selection of an SSB until N_max is reached.

FIG. 13 is a diagram for describing a beam failure recovery-related operation to which a method proposed in the present disclosure may be applied. Specifically, FIG. 13 illustrates a beam failure recovery operation in a primary cell (PCell).

Scheduling Request

A scheduling request (SR) is used to request an UL-SCH resource for new transmission.

0, 1 or one or more SR configurations may be configured in the MAC entity. The SR configuration is configured as a series of PUCCH resources for an SR in different BWPs and cells. In the case of a logical channel, a maximum of one PUCCH resource is configured for an SR per BWP.

Each SR configuration corresponds to one or more logical channels. Each logical channel may be mapped to 0 or one SR configuration configured by RRC. An SR configuration of a logical channel that has triggered a BSR (when such a configuration is present) is considered as a corresponding SR configuration for a triggered SR.

RRC configures the following parameters for a receiving scheduling request procedure.

SR-Prohi bitTimer (per SR configuration)
sr-TransMax (per SR configuration).

The following UE variables are used for the scheduling request procedure.

SR_COUNTER (per SR configuration).

If an SR is triggered and other pending SRs corresponding to the same SR configuration are not present, the MAC entity needs to configure SR_COUNTER of a corresponding SR configuration to 0.

When an SR is triggered, it is considered that the SR is pending until it is cancelled. All pending SRs triggered before a MAC PDU assembly are cancelled, and sr-Prohi bitTimer needs to be stopped until the MAC PDU is transmitted. The PDU includes a Long or Short BSR MAC CE including a buffer status up to the last event triggered before the MAC PDU assembly. When all pending data available for transmission in which UL grant can be transmitted can be accommodated, all the pending SRs are cancelled, and each sr-Prohi bitTimer needs to be stopped.

It is considered that only PUCCH resources of a BWP activated in a time of SR transmission occasion are valid.

One MAC entity in which one or more SRs are pending needs to perform the following on each pending SR:

1> when a valid PUCCH resource configured for a pending SR is not present in the MAC entity:
2> an SpCell starts a random access procedure and cancels a pending SR.
1> If not, in the case of an SR configuration corresponding to a pending SR:
2> An MAC entity has an SR transmission occasion on valid PUCCH resource for a configured SR;
2> in a time of SR transmission occasion, sr-Prohi bit-Timer is not executed;
2> a PUCCH resource for an SR transmission occasion does not overlap a measurement gap;
2> When a PUCCH resource for an SR transmission occasion does not overlap an UL-SCH resource:
3> when SR_COUNTER<sr-TransMax:
4> SR_COUNTER is increased by 1.
4> a physical layer indicates that an SR is signaled on one valid PUCCH resource for an SR;
4> sr-Prohi bitTimer is started.
3> In other cases:
4> the release of a PUCCH for all serving cells is notified through RRC;
4> the release of an SRS for all serving cells is notified through RRC;
4> configured downlink assignment and an uplink grant are released.
4> all PUSCH resources for semistatic CSI report are cleared.
4> an SpCell starts a random access procedure and cancels all pending SRs.

Reference 1: when an MAC entity has more than one overlapping valid PUCCH resources for an SR transmission occasion, the selection of a valid PUCCH resource for an SR for signaling the SR depends on a UE implementation.

Reference 2: when two or more individual SRs triggers a command instructing that an SR should be signals in the same valid PUCCH resource from a MAC entity to a PHY layer, SR_COUNTER for a relevant SR configuration is increased once.

The MAC entity may stop a random access procedure in progress (initiated by the MAC entity before a MAC PDU assembly) due to a pending SR in which a valid PUCCH resource is not configuration. Such a random access procedure may be stopped until a MAC PDU is transmitted by using an UL grant other than an UL grant provided by a random access response. The PDU includes a buffer status until the last event at which a BSR is triggered before the MAC PDU assembly or when an UL grant(s) can accommodate all pending data available for transmission.

PUCCH Formats

PUCCH formats may be classified depending on symbol duration, a payload size, and multiplexing. Table 10 indicates corresponding PUCCH formats.

TABLE 10

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

Short-Duration PUCCH

A short-duration PUCCH may be divided into Formats 0 and 2. A short PUCCH having 2 symbols may be configured as one symbol short PUCCH structure is repeated.

The PUCCH Format 0 may support UCI having a maximum of 2 bits along with multiplexing. The Format 0 may be used when Low latency support, UCI having a small size, or a low PAPR is necessary. The Format 0 has a structure based on sequence (cyclic shift, CS) selection without a DMRS, and may generate 1 PRB or 1 to 2 symbols. Furthermore, the Format 0 may support a maximum of 3 UEs (in the case of 2 bits) or 6 UEs (in the case of 1 bit) per PRB.

The PUCCH Format 2 may support UCI having two bits or more without multiplexing. The PUCCH Format 2 may be used for Low latency support, UCI having a middle or large size. The PUCCH Format 2 may occupy 1 to 16 PRBs or 1 to 2 symbols. Furthermore, the PUCCH Format 2 may support one UE per PRB without multiplexing.

Long-Duration PUCCH

A PUCCH Format 1 may support UCI having a maximum of 2 bits along with multiplexing. The PUCCH Format 1 may be applied to coverage support, UCI having a small size, and many multiplexing. The PUCCH Format 1 has an LTE PF1-like structure (a structure in which an OCC and DMRS/UCI symbol of a time domain are intersected). The PUCCH Format 1 may occupy 1 PRB, 4 to 14 symbols, and may support a maximum of 84 UEs (12CSs×7 OCCs) per PRB.

A PUCCH Format 3 may support UCI having two bits or more without multiplexing. The PUCCH Format 3 may be applied to coverage support, UCI having a large size. The PUCCH Format 3 may occupy 1 to 16 PRBs, 4 to 14 symbols. The PUCCH Format 3 may support one UE per PRB without multiplexing.

A PUCCH Format 4 may support UCI having two bits or more along with multiplexing. The PUCCH Format 4 may be used for coverage support, UCI having a middle size. The PUCCH Format 4 has an LTE PF5-like structure (TDM of DMRS and DFTed UCI with F-domain OCC). The PUCCH Format 4 may occupy 1 PRB, 4 to 14 symbols, and may support a maximum of 2 UEs (when SF=2) or a maximum of 4 UEs (when SF=4) per PRB.

In Relation to UCI Multiplexing

When an overlap between a PUCCH(s)/PUSCH(s) occurs, multiplexing (i.e., UCI multiplexing) for UCI may be performed. The UCI multiplexing may be denoted as a PUCCH merging method. The UCI multiplexing may be configured as a procedure of Step 2.

In Step 1, a set of (in the time) not overlapped PUCCH resource(s) for UCI multiplexing may be determined (regardless of whether a PUSCH(s) is present) by merging a set of overlapping PUCCH resources.

Specifically, in Step 1, while PUCCH resource overlaps in a slot, a PUCCH resource (resource A) overlapping another PUCCH resource having the fastest start (and a maximum duration) may be determined. A PUCCH resource set (set X) overlapping the resource A may be determined. One PUCCH resource for multiplexing UCI of the resource A and the PUCCH resource of the set X may be determined.

The set X (including the resource A) may be replaced with the determined PUCCH resource.

In Step 2, when a PUCCH resource(s) overlaps a PUSCH (s) as a result in Step 1, pieces of UCI are multiplexed on the overlapped PUSCH. If not, pieces of UCI may be multiplexed on the determined PUCCH resource.

UCI Multiplexing on PUCCH

UE Procedure for reporting HARQ-ACK and an SR

ACKNACK PUCCH format 0+SR PUCCH format 0/1: in the case of a positive SR, HARQ-ACK may be transmitted in an AN PR0 along with an additional CS offset. In the case of a negative SR, HARQ-ACK may be transmitted in an ACKNACK PUCCH format 0 without an additional CS offset.

ACKNACK PUCCH format 1+SR PUCCH format 0: (an SR is dropped) only HARQ-ACK may be transmitted in the ACKNACK PUCCH format 1.

ACKNACK PUCCH format 1+SR PUCCH format 1: in the case of a positive SR, HARQ-ACK may be transmitted through a (corresponding) SR PUCCH format 1 resource. In the case of a negative SR, HARQ-ACK may be transmitted through an ACKNACK PUCCH format 1 resource.

ACKNACK PUCCH format 2/3/4+SR PUCCH format 0/1: In the case of configured K SR PUCCHs, UCI in which ceil (log 2 (K+1)) bits indicating (all) negative or positive SR (ID) are added and combined with HARQ-ACK bits may be transmitted in the ACKNACK PUCCH format 2/3/4 resource.

Table 11 illustrates an example of a pre-configured rule/method related to multiplexing (i.e., PUCCH merging) between an ACKNACK PUCCH format and an SR PUCCH format (e.g., 3GPP TS 38.213. section 9.2.5 Reference).

TABLE 11

If a UE would transmit a PUCCH with $O_{ACK}$ HARQ-ACK information bits in a resource using PUCCH format 2 or PUCCH format 3 or PUCCH format 4 in a slot, as described in Subclause 9.2.3, $\lceil \log_2(K + 1) \rceil$ bits representing a negative or positive SR, in ascending order of the values of schedulingRequestResourceId, are appended to the HARQ-ACK information bits and the UE transmits the combined $O_{UCI} = O_{ACK} + \lceil \log_2(K + 1) \rceil$ UCI bits in a PUCCH using a resource with PUCCH format 2 or PUCCH format 3 or PUCCH format 4 that the UE determines as described in Subclauses 9.2.1 and 9.2.3. An all-zero value for the $\lceil \log_2(K + 1) \rceil$ bits represents a negative SR value across all K SRs.

UE procedure for CSI and an SR report

CSI PUCCH format 2/3/4+SR PUCCH format 0/1: in the case of a configured K SR PUCCH, UCI in which ceil (log 2 (K+1)) bits indicating (all) negative or positive SR (ID) are added and combined with CSI feedback bits may be transmitted in the CSI PUCCH format 2/3/4 resource.

Table 12 illustrates an example of a pre-configured rule/method related to multiplexing between a CSI PUCCH format and an SR PUCCH format (i.e., PUCCH merging) (e.g., 3GPP TS 38.213. section 9.2.5 Reference).

TABLE 12

If a UE would transmit a PUCCH with $O_{CSI}$ CSI report bits in a resource using PUCCH format 2 or PUCCH format 3 or PUCCH format 4 in a slot, $\lceil \log_2(K + 1) \rceil$ bits representing corresponding negative or positive SR, in ascending order of the values of schedulingRequestResourceId, are prepended to the CSI information bits as described in Subclause 9.2.5.2 and the UE transmits a PUCCH with the combined $O_{UCI} = \lceil \log_2(K + 1) \rceil + O_{CSI}$ UCI bits in a resource using the PUCCH format 2 or PUCCH format 3 or PUCCH format 4 for CSI reporting. An all-zero value for the $\lceil \log_2(K + 1) \rceil$ bits represents a negative SR value across all K SRs.

UE Procedure for Reporting HARQ-ACK/SR and CSI when a PUCCH Resource Indicator (PRI) is Indicated HARQ-ACK/SR and CSI may be transmitted through a PUCCH resource. One PUCCH resource set may be selected from several sets based on a total of UCI payloadsize $N_{UCI}=(O_{ACK}+O_{SR}+O_{CSI}+O_{CRC})$. A PUCCH resource within the selected set may be indicated by a PRI signaled in DL scheduling DCI. Furthermore, the number of PRBs (actually used) in a PUCCH resource may be determined based on a total UCI size NUCI and a maximum of coding rate R configured based on a PUCCH format. A minimum number of PRBs which may transmit the total UCI size NUCI along the coding rate R may be selected.

UE Procedure for Reporting HARQ-ACK/SR and CSI if PRI is not Indicated

HARQ-ACK/SR and CSI may be transmitted through a CSI PUCCH resource. A PUCCH resource may be selected from multiple CSI PUCCH resources based on a total UCI payload size NUCI and a maximum coding rate R. A resource capable of delivering a minimum UCI capacity (e.g., {# of Res}×R) and the total UCI size NUCI may be selected. The number of PRBs (actually used) in a PUCCH resource may be determined based on the total UCI size NUCI and the maximum coding rate R.

UCI Multiplexing on a PUCCH According to Coupling Between an ACKNACK PUCCH Format and a CSI PUCCH Format Table 13 illustrates an example of UCI multiplexing on a PUCCH according to coupling between an ACKNACK PUCCH format and a CSI PUCCH format. In a PUCCH, in the case of a Part2 CSI report, a PUCCH resource and multiple PRBs for the corresponding PUCCH resource may be determined based on a UCI payload size assuming that a CSI report is rank 1.

TABLE 13

| | PUCCH-Format2-simultaneous-HARQ-ACK-CSI = True/ Determined resource with ACKNACK/SR + CSI is Format 2 | PUCCH-Format3/4-simultaneous-HARQ-ACK-CSI = True/ Determined resource with ACKNACK/SR + CSI is Format 3/4 |
|---|---|---|
| CSI configured with Format 2 | Jointly encode ACKNACK and CSI report | Jointly encode ACKNACK and CSI report |
| CSI configured with Format 3/4 | Jointly encode ACKNACK and CSI Part 1. Drop CSI Part 2. | Jointly encode ACKNACK and CSI Part 1 at the configured max code rate. Separately encode CSI Part 2 using the remaining resources (if any) in the PUCCH |

Physical Uplink Control Channel (PUCCH)

A PUCCH supports multiple formats. The PUCCH formats may be classified based on symbol duration, a payload size and multiplexing. Table 14 is a table illustrating an example of the PUCCH formats.

TABLE 14

| Format | PUCCH length in OFDM symbols | Number of bits | Usage | Others |
|---|---|---|---|---|
| 0 | 1-2 | ≤2 | 1 | sequence selection |
| 1 | 4-14 | ≤2 | 2 | sequence modulation |
| 2 | 1-2 | >2 | 4 | CP-OFDM |

TABLE 14-continued

| Format | PUCCH length in OFDM symbols | Number of bits | Usage | Others |
|---|---|---|---|---|
| 3 | 4-14 | >2 | 8 | DFT-s-OFDM (no UE multiplexing) |
| 4 | 4-14 | >2 | 16 | DFT-s-OFDM (Pre DFT OCC) |

The PUCCH formats in Table 14 may be basically divided into (1) a short PUCCH and (2) a long PUCCH. The PUCCH formats 0 and 2 may be included in the short PUCCH, and the PUCCH formats 1, 3 and 4 may be included in the long PUCCH.

A UE transmits one or two PUCCHs through a serving cell in different symbols within one slot. If two PUCCHs are transmitted in one slot, at least one of the two PUCCHs has a structure having a short PUCCH. That is, in one slot, (1) the transmission of a short PUCCH and a short PUCCH is possible and (2) the transmission of a long PUCCH and a short PUCCH is possible, but (3) the transmission of a long PUCCH and a long PUCCH is impossible.

The aforementioned contents (the 3GPP system, the frame structure, and the NR system) may be combined with methods to be described later, which are proposed in the present disclosure, and may be applied or may be supplemented in order to clarify a technical characteristic of the methods proposed in the present disclosure. The methods described hereinafter are classified merely for convenience of description, and some elements of any one method may be substituted with some elements of another method or may be mutually combined and applied.

In the present disclosure, a background of a BFRQ for an SCell and a method of effectively processing a beam failure occurring in a plurality of SCells are described.

In relation to the application of the aforementioned PRACH-based BFR procedure, the following contents may be considered. In the case of a PRACH-based BFR procedure to which a carrier aggregation (CA) is applied, an SCell may not have an UL carrier. Although an SCell has an UL carrier, it has technical limits in that a contention based PRACH cannot be configured. Accordingly, a PRACH-based BFR procedure to which a carrier aggregation (CA) is applied is limitedly applied to only a PCell or a PSCell.

Due to limits in the application of the aforementioned PRACH-based BFR procedure, the following problems occur. If a PCell is operated in a low frequency band (e.g., 6 GHz or less) and a high frequency band (e.g., 30 GHz) is to be operated as an SCell, there is a problem in that a BFR is not supported in the high frequency band in which BFR support is more importantly affected.

For the above reason, in Rel-16 NR MIMO work item, standardization for a BFR report for a secondary cell (SCell) is in progress. Accordingly, the following contents may be considered.

UL transmission is impossible in a corresponding SCell with respect to at least DL only SCell. Accordingly, a (dedicated) PUCCH resource(s) used when a base station is notified that a beam failure has occurred in a corresponding SCell may be configured in a special cell (SpCell). A beam failure recovery request (BFRQ) for the SCell may be performed based on the configured PUCCH resources.

Hereinafter, a PUCCH configured for the beam failure recovery of an SCell is referred to as a FR-PUCCH for convenience of description. The term is used to distinguish between the term and another PUCCH in helping understanding, and is not intended to limit the technical scope through the corresponding term.

A role of a BFR-PRACH is to transmit both 'the occurrence of a beam failure+new beam RS (set) information' to a base station.

In contrast, a role of a BFR-PUCCH is to notify a base station of only 'the occurrence of a beam failure for an SCell(s)'. Detailed information related to an occurred beam failure may be transmitted as a subsequent report.

For example, a UE may transmit, to a base station, a MAC CE (or UCI) including information for at least one of the following i) to iii) as the subsequent report.
  i) An SCell(s) in which a beam failure has occurred
    example: CC index(s)
  ii) whether a new beam for an SCell(s) in which a beam failure has occurred is present
  iii) a corresponding beam RS ID(+quality) when a new beam is present In the case of the iii), information for quality (RSRP or SINR) of a new beam(s) according to a beam RS ID(s) may be included.

A subsequent beam report does not need to be always triggered. Specifically, after receiving a BFR-PUCCH, a base station may deactivate an SCell(s) in which a BFR configuration has been configured for a corresponding UE.

The above operation is for increasing UL resource utilization. Specifically, there is a case where several tens of SCells are connected to one PCell/PSCell, and there may be many UEs sharing one PCell/PSCell UL from a base station viewpoint. When even such a case is considered, it is preferred that the amount of UL resources reserved in each UE as SCell BFRQ use is minimized in a PCell/PSCell. Accordingly, after receiving a BFR-PUCCH, the base station may deactivate an SCell(s) in which a beam failure has occurred.

A scheduling request (SR) PUCCH method may be reused in that the amount of information to be contained in a BFR-PUCCH is very small (e.g., 1 bit) and a corresponding BFR-PUCCH is transmitted only when an event of a UE occurs.

For example, when a BFR-PUCCH resource(s) is configured in PCell/PScell UL through a RRC message, the corresponding PUCCH resource(s) may be configured through only the PUCCH format 0 or the PUCCH format 1. The existing SR-related MAC sublayer operations, such as SR retransmission or an SR prohibit timer, may be reused. Corresponding BFRQ information may be transmitted through another PUCCH resource or PUSCH resource according to a collision handling rule and/or UCI multiplexing rule with a BFR-PUCCH and another PUCCH or PUSCH. In this case, the corresponding BFR-PUCCH resource(s) does not causes resource waste because the resource(s) is not a PUCCH resource always reserved from a base station viewpoint.

Even in a MAC sublayer-related operation viewpoint, the following embodiments may be considered.

For example, values in which an SR retransmission-related prohibit timer value, a maximum retransmission value, etc. will be applied to a BFRQ operation and values to be applied to a common scheduling request may be defined to be identically applied. For another example, in order for a BFRQ to be handled a urgent/important information compared to an SR, the values to be applied may be separately configured/defined with respect to the SR and BFRQ.

In particular, a base station that has received a BFRQ may deactivate a corresponding Scell(s) without performing beam recovery on an SCell(s) of a corresponding UE. In such a case, it will be unnecessary for the base station to retransmit the BFRQ several times because the base station will not allocate an UL-SCH to the UE. By considering this, a maximum retransmission value for the BFRQ may be smaller configured/defined. For example, the BFRQ may not be retransmitted (a maximum retransmission value=1).

If a BFR-PUCCH resource and an SR-PUCCH resource (for a specific BWP/serving cell) are (temporally) overlapped and configured and an event that an SR-related pre-defined event and BFRQ (for a corresponding BWP/serving cell) needs to be transmitted occurs, there is a problem in that ambiguity occurs regarding how a UE transmits which one of PUCCH resources configured for an SR use and PUCCH resources configured for a BFRQ use. The present disclosure proposes the following methods (e.g., Method 1(Method 1.1/1.2)/Method 2/Method 3/Method 4) of Proposal 1 as a solution thereto.

[Proposal 1]

If a BFR-PUCCH resource and an SR-PUCCH resource are overlapped and a scheduling request event (SR event) and a beam failure event (BF event) occur together, a UE/base station may operate according to Method 1(Method 1.1/1.2)/Method 2/Method 3/Method 4 to be described later.

[Method 1]

A UE may select a BFR-PUCCH resource and first transmit a BFRQ.

[Method 1.1]

A UE may stop (pend) an SR procedure, and may transmit an SR-PUCCH through a valid SR-PUCCH resource after BFRQ transmission.

[Method 1.2]

A UE may cancel a pending SR by considering a situation for a no valid PUCCH resource for an SR with respect to the SR, and may initiate a random access procedure.

Method 1 is a method giving priority to recovery of a beam.

Specifically, when an SR event and a BFR event as a case where an SR-PUCCH resource and a BFR-PUCCH resource are overlapped simultaneously occur, in Method 1, a UE selects and reports the BFR-PUCCH resource because the recovery of a beam is first. Effects according to Method 1 are as follows. A base station can more preferentially recognize a BFR situation than an SR-related situation with respect to a corresponding UE. A base station can preferentially perform a determination, such as that a beam recovery procedure is performed or a corresponding Scell(s) is deactivated.

If Method 1.1 is applied, when SR transmission/retransmission is controlled, an SR procedure may be changed so that the method is limitedly applied to a case where a collision against a BFRQ resource is not present. Table 15 is an embodiment of a MAC layer operation viewpoint related to the application of Method 1.1.

TABLE 15

1> If a valid PUCCH resource configured for a pending SR is not present in a MAC entity:
2> An SpCell starts a random access procedure (a random access-related procedure Reference) and cancels the pending SR.
1> If not, with respect to an SR configuration corresponding to the pending SR:
2> When an MAC entity has an SR transmission occasion on a valid PUCCH resource for a configured SR;
2> if sr-ProhibitTimer is not executed in a time of the SR transmission occasion;
2> a PUCCH resource for the SR transmission occasion does not overlap a measurement gap;
2> a PUCCH resource for the SR transmission occasion does not overlap an UL-SCH resource;
2> a PUCCH resource for the SR transmission occasion does not overlap a PUCCH resource for a BFRQ:
3> when SR_COUNTER < sr-TransMax:
4> SR_COUNTER is increased by 1;
4> a physical layer indicates that an SR is signaled on one valid PUCCH resource for the SR;
4> sr-ProhibitTimer is started.
3> In other cases:
4> Notification is provided so that a PUCCH for all serving cells is released through RRC;
4> Notification is provided so that an SRS for all serving cells is released through RRC;
4> Configured downlink assignment and an uplink grant are cleared.
4> All PUSCH resources for a semi-permanent CSI report are cleared.
4> An SpCell starts a random access procedure and cancels pending all SRs.
Reference 1: when a MAC entity has more than one overlapping valid PUCCH resource for an SR transmission occasion, the selection of a valid PUCCH resource for an SR for signaling the SR depends on a UE implementation.
Reference 2: when two or more individual SRs trigger a command to signal the SRs in the same valid PUCCH resource from the MAC entity to the PHY layer, SR_COUNTER for a relevant SR configuration is increased only once Furthermore, Method 1.2 is a method of operating an RS as a fall-back procedure (an underlined portion in Table 16). If the method is applied, the contents of Reference 3 in Table 16 may be applied to an operation of a UE/base station.

TABLE 16

1> If a valid PUCCH resource configured for a pending SR is not present in a MAC entity:
2> An SpCell starts a random access procedure (a random access-related procedure Reference) and cancels the pending SR.
1> If not, with respect to an SR configuration corresponding to the pending SR:
2> When an MAC entity has an SR transmission occasion on a valid PUCCH resource for a configured SR;
2> if sr-Prohi bitTimer is not executed in a time of the SR transmission occasion;
2> a PUCCH resource for the SR transmission occasion does not overlap a measurement gap;
2> a PUCCH resource for the SR transmission occasion does not overlap an UL-SCH resource;
2> a PUCCH resource for the SR transmission occasion does not overlap a PUCCH resource for a BFRQ:
3> when SR_COUNTER < sr-TransMax:
4> SR_COUNTER is increased by 1;
4> a physical layer indicates that an SR is signaled on one valid PUCCH resource for the SR;
4> sr-ProhibitTimer is started.
3> In other cases:
4> Notification is provided so that a PUCCH for all serving cells is released through RRC;
4> Notification is provided so that an SRS for all serving cells is released through RRC;
4> Configured downlink assignment and an uplink grant are cleared.
4> All PUSCH resources for a semi-permanent CSI report are cleared.
4> An SpCell starts a random access procedure and cancels pending all SRs.
Reference 1: when a MAC entity has more than one overlapping valid PUCCH resource for an SR transmission occasion, the selection of a valid PUCCH resource for an SR for signaling the SR depends on a UE implementation.
Reference 2: when two or more individual SRs trigger a command to signal the SRs in the same valid PUCCH resource from the MAC entity to the PHY layer, SR_COUNTER for a relevant SR configuration is increased only once.

TABLE 16-continued

Reference 3: when a PUCCH resource for an SR transmission occasion overlaps a PUCCH resource for the BFRQ tranmission occasion, a PUCCH resource for the SR transmission occasion is considered to be invalid (or considered to be pending in the case of Method 1.1 and Method 1.3)

[Method 2]

A UE may select a PUCCH resource separately configured/regulated to be used upon simultaneous transmission of a BFRQ event and an SR event, and may transmit an SR and BFRQ.

A base station may separately configure a PUCCH resource for BFRQ+SR in the UE. Specifically, the base station may configure, in the UE, an SR-dedicated PUCCH resource(s), a BFRQ-dedicated PUCCH resource(s), and a PUCCH resource(s) for an SR+BFRQ use. The UE may select a separately configured PUCCH resource and transmit the SR and BFRQ (i.e., when an SR event and a BFRQ event simultaneously occur) in the case of the SR+BFRQ.

[Method 3]

When a BFRQ/SR event occurs, a UE may transmit an SR/BFRQ in a specific PUCCH resource. Depending on whether an SR and BFRQ simultaneously occur, the UE may transmit a separate sequence/message.

The separate sequence/message may have its state divided into the following states depending on a format of the PUCCH resource and may be represented.

1) A cyclic shift value of a sequence in the case of the PUCCH format 0
2) A sequence in the case of the PUCCH format 1
3) UCI bits (on which channel coding will be performed) in the case of the PUCCH format 2/3/4

Specifically, it may be defined that the following states are divided and represented based on the 1) to 3).

① positive SR+positive BFRQ or positive SR+negative BFRQ (for SR-PUCCH)
② positive BFRQ+positive SR or positive BFRQ+negative SR (for BFR-PUCCH)
③ positive BFRQ+positive SR, positive BFRQ+negative SR, negative BFRQ+positive SR, or negative BFRQ+negative SR (for SR-PUCCH, BFR-PUCCH, or a PUCCH resource used for both cases of SR and BFR)

The ① may be applied to an SR-PUCCH, the ② may be applied to a BFR-PUCCH, and the ③ may be applied to a PUCCH resource used when an SR-PUCCH/BFR-PUCCH/SR and a BFR simultaneously occur.

In Method 3, a UE transmits a BFR-PUCCH/SR-PUCCH through one of a BFR-PUCCH resource and an SR-PUCCH resource having a collision. Specifically, in Method 3, in the case of an SR+BFRQ situation, it is defined/configured that a UE transmits a BFR-PUCCH/SR-PUCCH based on separately defined/configured UCI bits, a sequence, or a sequence to which a cyclic shift (CS) is applied depending on a PUCCH format.

For example, if a resource having the PUCCH format 0 is used for SR purposes, HARQ-ACK/NACK information may be additionally transmitted based on a CS value. The CS value may be differently defined/configured depending on whether a BFRQ occurs with respect to a PUCCH resource for an SR purpose by using such a principle. In contrast, a PUCCH resource for a BFR purpose uses a resource having the PUCCH format 0, a UE may transmit a corresponding PUCCH only in a BFR situation. In this case, information indicating whether an SR is positive (i.e., positive SR or negative SR) may also be transmitted depending on the CS value. In the case of the PUCCH format 1, the method may be applied by changing a sequence not the CS value. Based on such a principle, an SR and BFRQ-combined use PUCCH resource may be configured. That is, one PUCCH resource may be configured to be used for an SR use and a BFRQ use. For which use a corresponding PUCCH resource will be used may be reported depending on UCI transmitted through a corresponding PUCCH resource. Specifically, an SR use (SR event occurs), a BFRQ use (BFRQ event occurs) and/or an SR+BFRQ use (SR event and BFRQ event simultaneously occur) may be reported through the UCI.

The BFR/SR-combined use PUCCH resource may be limitedly applied to a case where 1) a plurality of SCells sharing one PUCCH resource from a BFRQ viewpoint and 2) a plurality of Scells sharing one PUCCH resource from an SR viewpoint are the same.

[Method 4]

A base station may configure an SR-PUCCH resource and a BFR-PUCCH resource to be always disposed at different symbols. Accordingly, a case where the SR-PUCCH resource and the BFR-PUCCH resource overlap can be prevented. A UE may not expect a configuration in which an SR-PUCCH resource and a BFR-PUCCH resource overlap.

Method 4 guarantees that an overlap between an SR-PUCCH resource and a BFR-PUCCH resource does not occur in resource allocation of a base station. In this case, there is an advantage in that a UE does not need to perform special handling on a collision situation between an SR-PUCCH and a BFR-PUCCH, but a degree of freedom of a PUCCH resource configuration of the base station may be limited. In particular, when a case where an SR PUCCH resource is configured every slot is considered, limitation inevitably occurs in symbol duration of an SR PUCCH resource.

From an implementation aspect, operations (e.g., the aforementioned proposal methods (e.g., operations related to beam failure recovery based on at least one of Method 1/Method 1-1/Method 1-2/Method 2/Method 3/Method 4 of Proposal 1)) of a base station/UE according to the aforementioned embodiments may be processed by the apparatus of FIGS. 17 to 21 (e.g., the processor 102, 202 in FIG. 18) to be described later.

Furthermore, operations (e.g., operations related to beam failure recovery based on at least one of Method 1/Method 1-1/Method 1-2/Method 2/Method 3/Method 4 of Proposal 1) of a base station/UE according to an embodiment may be stored in a memory (e.g., 104, 204 in FIG. 18) in the form of an instruction/program (e.g., an instruction or an executable code) for driving at least one processor (e.g., 102, 202 in FIG. 18).

FIG. 14 illustrates an example of signaling between a UE/base station to which a method proposed in the present disclosure may be applied. Specifically, FIG. 14 illustrates an example of signaling between a user equipment (UE)/base station (BS) based on the aforementioned proposal method (e.g., Method 1/Method 1-1/Method 1-2/Method 2/Method 3/Method 4 of Proposal 1). In this case, the UE/BS is merely an example, and may be applied by being replaced with various apparatus as described in FIGS. 17 to 21. FIG.

14 is merely for convenience of description, and does not limit the scope of the present disclosure. Furthermore, some step(s) illustrated in FIG. 14 may be omitted depending on a situation and/or a configuration.

The UE may receive, from the BS, BFR related Config., that is, configuration information related to BFR and/or SR related Config., that is, a configuration related to an SR (S1410). For example, the configuration information related to BFR may include configuration information related to an operation of Method 1/Method 1-1/Method 1-2/Method 2/Method 3/Method 4 of Proposal 1. The configuration information related to BFR may include a resource configuration (e.g., a configuration for a BFR-PUCCH resource) for a BFR, configuration information for a timer or a counter. Furthermore, the configuration information related to an SR may include a resource configuration (e.g., a configuration for an SR-PUCCH resource) for an SR, configuration information for a timer or a counter. The configuration information related to BFR and/or the configuration information related to an SR may be delivered through higher layer signaling (e.g., RRC signaling), etc.

For example, the operation of receiving, by the UE (100/200 in FIGS. 17 to 21), the BFR related Config./SR related Config. from the BS in step S1410 may be implemented by the apparatus of FIGS. 17 to 21 to be described later. For example, referring to FIG. 18, the one or more processors 102 may control the one or more transceivers 106 and/or the one or more memories 104 to receive the BFR related Config./SR related Config. The one or more transceivers 106 may receive the BFR related Config./SR related Config. from the BS.

The UE may transmit a PUCCH (e.g., a BFR-PUCCH, a BFR related PUCCH, an SR-PUCCH, an SR related PUCCH) to the BS (S1420). For example, based on Method 1/Method 1-1/Method 1-2/Method 2/Method 3/Method 4 of Proposal 1, the UE may transmit the PUCCH (e.g., a BFR-PUCCH, a BFR related PUCCH, an SR-PUCCH, an SR related PUCCH) to the BS. For example, when an SR-PUCCH resource and a BFR-PUCCH resource overlap, the UE may preferentially transmit a BFRQ (i.e., a BFR-PUCCH) according to a given rule, may transmit a BFRQ and an SR through separate PUCCH resources, or may transmit BFR/SR-PUCCH based on separately defined/configured UCI bits, a sequence, or a sequence to which a cyclic shift (CS) has been applied according to a PUCCH format. Alternatively, the UE may not expect a case where an SR-PUCCH resource and a BFR-PUCCH resource overlap itself. Furthermore, for example, prior to the PUCCH transmission, an operation in the MAC layer described in Method 1/Method 1-1/Method 1-2/Method 2/Method 3/Method 4 of Proposal 1 may be preferentially performed. As a detailed example, in the case of a method of preferentially transmitting, by the UE, a BFRQ, the operation in the MAC layer described in Table 15/Table 16 prior to the BFRQ transmission may be preferentially performed.

For example, the operation of transmitting, by the UE (100/200 in FIGS. 17 to 21), the PUCCH to the BS in step S1420 may be implemented by the apparatus of FIGS. 17 to 21 to be described later. For example, referring to FIG. 18, the one or more processors 102 may control the one or more transceivers 106 and/or the one or more memories 104 to transmit the PUCCH. The one or more transceivers 106 may transmit the PUCCH to the BS.

The UE may receive an UL grant (e.g., UL DCI) for PUSCH (e.g., a BFR-related PUSCH) scheduling from the BS (S1430). For example, with reference to Method 1/Method 1-1/Method 1-2/Method 2/Method 3/Method 4 of Proposal 1, the PUSCH may be a PUSCH for delivering a MAC-CE (or UCI) including a corresponding beam RS ID (and/or quality (e.g., RSRP/SINR) of a corresponding beam) when a report (e.g., SCell(s) information (e.g., CC index(s)) in which a beam failure has occurred) related to BFR and/or whether a new beam for a corresponding SCell(s) is present and/or a new beam is present. That is, the UE may receive scheduling information of a PUSCH for delivering a MAC-CE (or UCI) including a report related to the BFR through a PDCCH (i.e., a PDCCH for an UL grant).

For example, the operation of receiving, by the UE (100/200 in FIGS. 17 to 21), the UL grant for PUSCH scheduling from the BS in step S1430 may be implemented by the apparatus of FIGS. 17 to 21 to be described later. For example, referring to FIG. 18, the one or more processors 102 may control the one or more transceivers 106 and/or the one or more memories 104 to receive the UL grant for PUSCH scheduling. The one or more transceivers 106 may receive the UL grant for PUSCH scheduling from the BS.

The UE may transmit, to the BS, a PUSCH (e.g., a BFR-related PUSCH) scheduled based on the UL grant (S1440). For example, with reference to Method 1/Method 1-1/Method 1-2/Method 2/Method 3/Method 4 of Proposal 1, the UE may transmit, to the BS, a MAC-CE (or UCI) including a beam report including the BFR through the PUSCH.

For example, the operation of transmitting, by the UE (100/200 in FIGS. 17 to 21), the PUSCH scheduled based on the UL grant to the BS in step S1440 may be implemented by the apparatus of FIGS. 17 to 21 to be described later. For example, referring to FIG. 18, the one or more processors 102 may control the one or more transceivers 106 and/or the one or more memories 104 to transmit the PUSCH scheduled based on an UL grant. The one or more transceivers 106 may transmit the PUSCH scheduled based on the UL grant to the BS.

As described above, the aforementioned BS/UE signaling and operation (e.g., Method 1/Method 1-1/Method 1-2/Method 2/Method 3/Method 4 of Proposal 1/FIG. 14) may be implemented by the apparatus (e.g., FIGS. 17 to 21) to be described hereinafter. For example, the BS may correspond to a transmission apparatus/first apparatus, the UE may correspond to a reception apparatus/second apparatus and an opposite case thereof may also be considered. For example, the aforementioned the BS/UE signaling and operation (e.g., Method 1/Method 1-1/Method 1-2/Method 2/Method 3/Method 4 of Proposal 1/FIG. 14) may be processed by the one or more processors (e.g., 102, 202) in FIG. 18. The aforementioned BS/UE signaling and operation (e.g., Method 1/Method 1-1/Method 1-2/Method 2/Method 3/Method 4 of Proposal 1/FIG. 14) may be stored in a memory (e.g., the one or more memories 104, 204 in FIG. 18) in the form of an instruction/program (e.g., an instruction or an executable code) for driving the at least one processor (e.g., 102, 202) in FIG. 18.

Hereinafter, the aforementioned embodiments are specifically described with reference to FIG. 15 from an operation aspect of a UE. Methods described hereinafter are classified merely for convenience of description, and some elements of any one method may be substituted with some elements of another method or they may be mutually combined and applied.

FIG. 15 is a flowchart for describing a method of transmitting, by a UE, a physical uplink control channel in a wireless communication system according to an embodiment of the present disclosure.

Referring to FIG. 15, the method of transmitting, by a user equipment, a physical uplink control channel (PUCCH) in a wireless communication system according to an embodiment of the present disclosure includes steps of receiving configuration information related to a PUCCH (S1510) and transmitting the PUCCH based on the configuration information (S1520).

In S1510, the UE receives, from abase station, configuration information related to a physical uplink control channel (PUCCH). The configuration information related to the PUCCH may be based on at least one of configuration information related to BFR or configuration information related to an SR in FIG. 14.

According to S1510, the operation of receiving, by the UE (100/200 in FIGS. 17 to 21), the configuration information related to the PUCCH from the base station (100/200 in FIGS. 17 to 21) may be implemented by the apparatus of FIGS. 17 to 21. For example, referring to FIG. 18, the one or more processors 102 may control the one or more transceivers 106 and/or the one or more memories 104 to receive the configuration information related to the PUCCH from the base station 200.

In S1520, the UE transmits the PUCCH to the base station based on the configuration information.

According to an embodiment, the PUCCH may be transmitted in a PUCCH resource related to a scheduling request (SR).

Base on the PUCCH resource related to the SR being overlapped PUCCH resources, the PUCCH may be transmitted in a specific PUCCH resource determined among the overlapped PUCCH resources.

The specific PUCCH resource may be related to beam failure recovery (BFR).

According to an embodiment, the beam failure recovery (BFR) may be related to a beam failure of at least one secondary cell (SCell).

According to an embodiment, the specific PUCCH resource may be related to the PUCCH format 0 or the PUCCH format 1.

According to an embodiment, the PUCCH related to the beam failure recovery (BFR) may be transmitted based on a parameter related to a scheduling request (SR). The parameter related to the scheduling request (SR) may be related to at least one of a timer related to the transmission of the SR or a maximum transmission number of the SR For example, the timer related to the transmission of the SR may be based on a higher layer parameter sr-Prohi bitTimer. The maximum transmission number of the SR may be based on a higher layer parameter sr-TransMax.

According to S1520, the operation of transmitting, by the UE (100/200 in FIGS. 17 to 21), the PUCCH to the base station (100/200 in FIGS. 17 to 21) based on the configuration information may be implemented by the apparatus of FIGS. 17 to 21. For example, referring to FIG. 18, the one or more processors 102 may control the one or more transceivers 106 and/or the one or more memories 104 to transmit the PUCCH to the base station 200 based on the configuration information.

The method may further include a step of receiving downlink control information (DCI). Specifically, in the step of receiving the DCI, the UE receives, from the base station, downlink control information (DCI) that schedules a physical uplink shared channel (PUSCH) related to the PUCCH. The present embodiment may be based on S1430 in FIG. 14.

According to the step of receiving the DCI, the operation of receiving, by the UE (100/200 in FIGS. 17 to 21), the DCI that schedules the PUSCH related to the PUCCH from the base station (100/200 in FIGS. 17 to 21) may be implemented by the apparatus of FIGS. 17 to 21. For example, referring to FIG. 18, the one or more processors 102 may control the one or more transceivers 106 and/or the one or more memories 104 to receive, from the base station 200, the DCI that schedules the PUSCH related to the PUCCH.

The method may further include a step of transmitting a physical uplink shared channel (PUSCH). Specifically, in the step of transmitting the PUSCH, the UE transmits the PUSCH to the base station based on the DCI. The present embodiment may be based on S1440 in FIG. 14.

According to an embodiment, the PUSCH may be related to a medium access control-control element (MAC-CE) including information related to the beam failure.

The MAC-CE may include information related to at least one of 1) at least one secondary cell (SCell) or 2) a new beam.

The information related to a new beam may include at least one of i) whether the new beam is present or ii) an ID of a reference signal related to the new beam.

According to the step of transmitting the PUSCH, the operation of transmitting, by the UE (100/200 in FIGS. 17 to 21), the PUSCH to the base station (100/200 in FIGS. 17 to 21) based on the DCI may be implemented by the apparatus of FIGS. 17 to 21. For example, referring to FIG. 18, the one or more processors 102 may control the one or more transceivers 106 and/or the one or more memories 104 to transmit the PUSCH to the base station 200 based on the DCI.

Hereinafter, the aforementioned embodiments are specifically described with reference to FIG. 16 from an operation aspect of a base station. Methods described hereinafter are classified merely for convenience of description, and some elements of any one method may be substituted with some elements of another method or they may be mutually combined and applied.

FIG. 16 is a flowchart for describing a method of receiving, by a base station, a physical uplink control channel in a wireless communication system according to another embodiment of the present disclosure.

Referring to FIG. 16, the method of receiving, by the base station, the physical uplink control channel in a wireless communication system according to another embodiment of the present disclosure includes steps of transmitting configuration information related to a PUCCH (S1610) and receiving the PUCCH based on the configuration information (S1620).

In S1610, the base station transmits, to a UE, the configuration information related to the PUCCH. The configuration information related to the PUCCH may be based on at least one of the configuration information related to BFR or the configuration information related to an SR in FIG. 14.

According to S1610, the operation of transmitting, by the base station (100/200 in FIGS. 17 to 21), the configuration information related to the PUCCH to the UE (100/200 in FIGS. 17 to 21) may be implemented by the apparatus of FIGS. 17 to 21. For example, referring to FIG. 18, the one or more processors 202 may control the one or more transceivers 206 and/or the one or more memories 204 to transmit, to the UE 100, the configuration information related to the PUCCH.

In S1620, the base station receives the PUCCH from the UE based on the configuration information.

According to an embodiment, the PUCCH may be transmitted in a PUCCH resource related to a scheduling request (SR).

Based on the PUCCH resource related to the SR being overlapped PUCCH resources, the PUCCH may be transmitted in a specific PUCCH resource determined among the overlapped PUCCH resources.

The specific PUCCH resource may be related to beam failure recovery (BFR).

According to an embodiment, the beam failure recovery (BFR) may be related to a beam failure of at least one secondary cell (SCell).

According to an embodiment, the specific PUCCH resource may be based on the PUCCH format 0 or the PUCCH format 1.

According to an embodiment, the PUCCH related to the beam failure recovery (BFR) may be transmitted based on a parameter related to the scheduling request (SR). The parameter related to the scheduling request (SR) may be related to at least one of a timer related to the transmission of the SR or a maximum transmission number of the SR. For example, the timer related to the transmission of the SR may be based on a higher layer parameter sr-Prohi bitTimer, and the maximum transmission number of the SR may be based on a higher layer parameter sr-TransMax.

According to S1620, the operation of receiving, by the base station (100/200 in FIGS. 17 to 21), the PUCCH from the UE (100/200 in FIGS. 17 to 21) based on the configuration information may be implemented by the apparatus of FIGS. 17 to 21. For example, referring to FIG. 18, the one or more processors 202 may control the one or more transceivers 206 and/or the one or more memories 204 to receive the PUCCH from the UE 100 based on the configuration information.

The method may further include a step of transmitting downlink control information (DCI). Specifically, in the step of transmitting the DCI, the base station transmits, to the UE, DCI that schedules a PUSCH related to a PUCCH. The present embodiment may be based on S1430 in FIG. 14.

According to the step of transmitting the DCI, the operation of transmitting, by the base station (100/200 in FIGS. 17 to 21), the DCI that schedules the PUSCH related to the PUCCH to the UE (100/200 in FIGS. 17 to 21) may be implemented by the apparatus of FIGS. 17 to 21. For example, referring to FIG. 18, the one or more processors 202 may control the one or more transceivers 206 and/or the one or more memories 204 to transmit, to the UE 100, the DCI that schedules the PUSCH related to the PUCCH.

The method may further include a step of receiving a physical uplink shared channel (PUSCH). Specifically, in the step of receiving the PUSCH, the base station receives the PUSCH from the UE based on the DCI. The present embodiment may be based on S1440 in FIG. 14.

According to an embodiment, the PUSCH may be related to a medium access control-control element (MAC-CE) including information related to the beam failure.

The MAC-CE may include information related to at least one of 1) at least one secondary cell (SCell) or 2) a new beam.

The information related to a new beam may include at least one of i) whether the new beam is present or ii) an ID of a reference signal related to the new beam.

According to the step of receiving the PUSCH, the operation of receiving, by the base station (100/200 in FIGS. 17 to 21), the PUSCH from the UE (100/200 in FIGS. 17 to 21) based on the DCI may be implemented by the apparatus of FIGS. 17 to 21. For example, referring to FIG. 18, the one or more processors 202 may control the one or more transceivers 206 and/or the one or more memories 204 to receive the PUSCH from the UE 100 based on the DCI.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 17 illustrates a communication system 1 applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or (the wireless device 100x and the wireless device 100x) of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 19 illustrates a signal process circuit for a transmission signal.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 20 illustrates another example of a wireless device applied to the present disclosure.

The wireless device may be implemented in various forms according to a use-case/service (refer to FIG. 17). Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 21 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of the method and apparatus for transmitting and receiving physical uplink control channels in a wireless communication system according to an embodiment of the present disclosure are described as follows.

According to an embodiment of the present disclosure, a physical uplink control channel (PUCCH) is transmitted in a PUCCH resource related to a scheduling request (SR). Based on the PUCCH resource related to the SR being overlapped PUCCH resources, the PUCCH is transmitted in a specific PUCCH resource determined among the overlapped PUCCH resources. The specific PUCCH resource is related to beam failure recovery (BFR).

Beam failure recovery may be performed based on a PUCCH related to a scheduling request. The beam failure recovery (BFR) can also be effectively supported for a secondary cell (SCell). In particular, when a beam failure occurs in a secondary cell (SCell) for a high frequency band (e.g., 30 GHz), beam failure recovery can be more effectively performed.

Furthermore, when a PUCCH resource related to beam failure recovery overlaps a PUCCH resource related to a scheduling request (e.g., an SR attributable to an event other than beam failure recovery), a PUCCH resource related to the beam failure recovery may be transmitted to have priority. Accordingly, when an SR event and a BFR event simultaneously occur, ambiguity in a UE operation can be solved, and a beam failure recovery procedure (BFR procedure) can be more quickly initiated.

If a UE notifies a base station of only the occurrence of a beam failure through a PUCCH, relatively small information (e.g., 1 bit) is delivered. In this aspect, the PUCCH needs to be transmitted using the existing procedure.

According to an embodiment of the present disclosure, a PUCCH related to beam failure recovery (BFR) is transmitted based on a parameter related to the scheduling request (SR). The parameter related to the scheduling request (SR) is related to at least one of a timer related to the transmission of the SR or a maximum transmission number of the SR. Accordingly, the beam failure recovery (BFR) can be initiated based on the existing scheduling request procedure.

If a base station is notified of only the occurrence of a beam failure, a subsequent report related to beam failure recovery needs to be performed. According to an embodiment of the present disclosure, a UE receives downlink control information (DCI) that schedules a PUSCH related to a PUCCH, and transmits the PUSCH based on the DCI. The PUSCH is related to a medium access control-control element (MAC-CE) including information related to the beam failure. The MAC-CE includes information related to at least one of 1) at least one secondary cell (SCell) or 2) a new beam. Accordingly, detailed information related to a beam failure can be effectively delivered through a PUSCH scheduled based on the existing scheduling procedure.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method performed by a user equipment in a wireless communication system, the method comprising:
   receiving configuration information related to a Scheduling Request (SR); and
   transmitting the SR on a valid Physical Uplink Control Channel (PUCCH) resource among PUCCH resources based on the configuration information,
   wherein the valid PUCCH resource is based on a PUCCH resource on a bandwidth part (BWP) which is active at a time of SR transmission occasion, and
   wherein, based on one or more PUCCH resources overlapping with a PUCCH resource for a Secondary Cell (SCell) beam failure recovery for the SR transmission occasion:
   the PUCCH resource for the SCell beam failure recovery among the overlapping PUCCH resources is determined as valid, and
   the SR is transmitted on the PUCCH resource for the SCell beam failure recovery.

2. The method of claim 1,
   wherein the PUCCH resource for the SCell beam failure recovery is based on a PUCCH format 0 or a PUCCH format 1.

3. The method of claim 1, further comprising receiving downlink control information (DCI) scheduling a physical uplink shared channel (PUSCH) related to the SR.

4. The method of claim 3, further comprising transmitting the PUSCH based on the DCI.

5. The method of claim 4,
   wherein the PUSCH is related to a medium access control-control element (MAC-CE) including information related to the beam failure recovery (BFR).

6. The method of claim 5,
   wherein the MAC-CE includes information for at least one of 1) an index related to at least one SCell in which a beam failure is detected or 2) a new beam.

7. The method of claim 6,
wherein the information for the new beam includes i) whether the new beam is present and ii) an ID of a Reference Signal (RS) related to the new beam.

8. The method of claim 1,
wherein the transmission of the SR is performed based on i) a timer related to the transmission of the SR and ii) a maximum transmission number of the SR.

9. A user equipment configured to operate in a wireless communication system, the user equipment comprising:
one or more transceivers;
one or more processors; and
one or more memories operatively coupled to the one or more processors and storing instructions that, based on being executed by the one or more processors, perform operations comprising:
receiving, through the one or more transceivers, configuration information related to a Scheduling Request (SR); and
transmitting, through the one or more transceivers, the SR on a valid Physical Uplink Control Channel (PUCCH) resource among PUCCH resources based on the configuration information,
wherein the valid PUCCH resource is based on a PUCCH resource on a bandwidth part (BWP) which is active at a time of SR transmission occasion, and
wherein, based on one or more PUCCH resources overlapping with a PUCCH resource for a Secondary Cell (SCell) beam failure recovery for the SR transmission occasion:
the PUCCH resource for the SCell beam failure recovery among the overlapping PUCCH resources is determined as valid, and
the SR is transmitted on the PUCCH resource for the SCell beam failure recovery.

10. A base station configured to operate in a wireless communication system, the base station comprising:
one or more transceivers;
one or more processors; and
one or more memories operatively coupled to the one or more processors and storing instructions that, based on being executed by the one or more processors, perform operations comprising:
transmitting, through the one or more transceivers, configuration information related to a Scheduling Request (SR), and
receiving, through the one or more transceivers, the SR on a valid Physical Uplink Control Channel (PUCCH) resource among PUCCH resources based on the configuration information,
wherein the valid PUCCH resource is based on a PUCCH resource on a bandwidth part (BWP) which is active at a time of SR transmission occasion,
wherein, based on one or more PUCCH resources overlapping with a PUCCH resource for a Secondary Cell (SCell) beam failure recovery for the SR transmission occasion:
the PUCCH resource for the SCell beam failure recovery among the overlapping PUCCH resources is determined as valid, and
the SR is received on the PUCCH resource for the SCell beam failure recovery.

* * * * *